(12) United States Patent
Sun et al.

(10) Patent No.: US 11,782,642 B2
(45) Date of Patent: Oct. 10, 2023

(54) SYSTEMS AND METHODS OF DETERMINING DEGRADATION IN ANALOG COMPUTE-IN-MEMORY (ACIM) MODULES

(71) Applicant: Western Digital Technologies, Inc., San Jose, CA (US)

(72) Inventors: Chao Sun, San Jose, CA (US); Tung Thanh Hoang, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/347,457

(22) Filed: Jun. 14, 2021

(65) Prior Publication Data
US 2022/0398036 A1 Dec. 15, 2022

(51) Int. Cl.
*G06F 3/06* (2006.01)
*G06F 11/10* (2006.01)

(52) U.S. Cl.
CPC .......... *G06F 3/0659* (2013.01); *G06F 3/0616* (2013.01); *G06F 3/0619* (2013.01); *G06F 3/0673* (2013.01); *G06F 11/1068* (2013.01)

(58) Field of Classification Search
CPC .... G06F 3/0659; G06F 3/0616; G06F 3/0619; G06F 3/0673; G06F 1/1068;
(Continued)

(56) References Cited

U.S. PATENT DOCUMENTS 6,003,152 A * 12/1999 Singhal ............... G06F 11/1028
714/767
8,429,498 B1 * 4/2013 Anholt ................ G06F 11/1048
714/764
(Continued)

FOREIGN PATENT DOCUMENTS

KR 19940038845 A * 12/1994
KR 20200103262 A 9/2020

OTHER PUBLICATIONS

International Search Report and Written Opinion for International Application No. PCT/US2022/014753 dated May 25, 2022.
(Continued)

*Primary Examiner* — Albert Decady
*Assistant Examiner* — Enam Ahmed
(74) *Attorney, Agent, or Firm* — PATTERSON + SHERIDAN, LLP; Steven H. VerSteeg

(57) ABSTRACT

Certain aspects of the present disclosure provide techniques for performing compute in memory (CIM) computations. A device comprises a CIM module configured to apply a plurality of analog weights to data using multiply-accumulate operations to generate an output. The device further comprises a digital weight storage unit configured to store digital weight references, wherein a digital weight reference corresponds to an analog weight of the plurality of analog weights. The device also comprises a device controller configured to program the plurality of analog weights to the CIM module based on the digital weight references and determine degradation of one or more analog weights. The digital weight references in the digital weight storage unit are populated with values from a host device. Degraded analog weights in the CIM module are replaced with corresponding digital weight references from the digital weight storage unit without reference to the host device.

18 Claims, 14 Drawing Sheets

(58) Field of Classification Search
CPC .......... G06F 11/1068; H03M 13/1165; H03M 13/255; H03M 13/2906; H03M 13/6552; H03M 13/036; H03M 13/152; H03M 13/1102; H03M 13/015; H03M 13/27; H04L 1/0011
USPC ........................................................ 714/764
See application file for complete search history.

(56) References Cited

U.S. PATENT DOCUMENTS

| | | | |
|---|---|---|---|
| 9,912,352 B1 | 3/2018 | Qin et al. | |
| 10,552,251 B2 | 2/2020 | Qin et al. | |
| 10,691,537 B2 | 6/2020 | Sun et al. | |
| 10,998,920 B1* | 5/2021 | Tate | H03M 13/1111 |
| 11,144,316 B1* | 10/2021 | Far | G11C 7/1012 |
| 2010/0162085 A1* | 6/2010 | Mati | G11C 29/52 |
| | | | 341/158 |
| 2010/0269022 A1* | 10/2010 | Clark | G06F 11/183 |
| | | | 714/764 |
| 2013/0254627 A1* | 9/2013 | Jeddeloh | G06F 11/108 |
| | | | 714/764 |
| 2016/0041871 A1* | 2/2016 | Maeda | G06F 11/1016 |
| | | | 714/764 |
| 2016/0110257 A1* | 4/2016 | Ratnam | G11C 29/42 |
| | | | 714/764 |
| 2016/0182075 A1* | 6/2016 | Devarajan | H03M 1/121 |
| | | | 341/120 |
| 2017/0125114 A1* | 5/2017 | Alhussien | H03M 13/1108 |
| 2018/0300618 A1* | 10/2018 | Obradovic | G06N 3/04 |
| 2019/0042160 A1 | 2/2019 | Kumar et al. | |
| 2019/0042949 A1 | 2/2019 | Young et al. | |
| 2020/0410319 A1 | 12/2020 | Pellizzer | |
| 2021/0073619 A1 | 3/2021 | Wang et al. | |
| 2021/0133549 A1 | 5/2021 | Wang et al. | |
| 2021/0343343 A1* | 11/2021 | Teague | G11C 7/16 |
| 2021/0397967 A1* | 12/2021 | Tsai | G06N 3/084 |

OTHER PUBLICATIONS

International Search Report and Written Opinion for International Application No. PCT/US2022/014762 dated May 31, 2022.
Angizi et al. "Accelerating Deep Neural Networks in Processing-in-Memory Platforms: Analog or Digital Approach?," 2019 IEEE Computer Society Annual Symposium on VLSI (ISVLSI), 2019, pp. 197-202, doi: 10.1109/ISVLSI.2019.00044.
Feinberg et al. "Making Memristive Neural Network Accelerators Reliable," 2018 IEEE International Symposium on High Performance Computer Architecture (HPCA), 2018, pp. 52-65, doi: 10.1109/HPCA.2018.00015.
Joshi et al. "Accurate deep neural network inference using computational phase-change memory," Nature Communications, vol. 11, No. 2473, 2020, 13 pages, <https://doi.org/10.1038/s41467-020-16108-9>.
Li et al. "Improving Efficiency in Neural Network Accelerator Using Operands Hamming Distance Optimization," Feb. 13, 2020, 12 pages, <https://arxiv.org/abs/2002.05293>.
Qin et al. "Robustness of Neural Networks against Storage Media Errors," Sep. 18, 2017, 9 pages, <https://arxiv.org/abs/1709.06173v1>.
Ruder "An Overview of Multi-Task Learning in Deep Neural Networks," May 29, 2017, 35 pages, <https://ruder.io/multi-task/>.
Shafiee et al. "ISAAC: a convolutional neural network accelerator with in-situ analog arithmetic in crossbars," 2016 ACM/IEEE 43rd Annual International Symposium on Computer Architecture (ISCA), 2016, 13 pages, doi: 10.1109/ISCA.2016.12.
Tasoulas et al. "Weight-Oriented Approximation for Energy-Efficient Neural Network Inference Accelerators," in IEEE Transactions on Circuits and Systems—I: Regular Papers, vol. 67, No. 12, 2020, 14 pages, doi: 10.1109/TCSI.2020.3019460.
Ward-Foxton "Processor-in-memory chip speeds AI computations," Jul. 16, 2020, Embedded, 4 pages, <https://www.embedded.com/processor-in-memory-chip-speeds-ai-computations/>.
Xiao et al. "Analog architectures for neural network acceleration based on non-volatile memory," 2020 Applied Physics Reviews, vol. 7, No. 3, pp. 031301-1-031301-34, doi: 10.1063/1.5143815.
Lin et al. "Performance Impacts of Analog ReRAM Non-ideality on Neuromorphic Computing," in IEEE Transactions on Electron Devices, vol. 66, No. 3, pp. 1289-1295, Mar. 2019, doi: 10.1109/TED.2019.2894273.

* cited by examiner

SYSTEMS AND METHODS OF DETERMINING DEGRADATION IN ANALOG COMPUTE-IN-MEMORY (ACIM) MODULES

BACKGROUND OF THE DISCLOSURE

Field of the Disclosure

Aspects of the present disclosure relate to identifying and mitigating hardware circuit degradation as it relates to compute in hardware acceleration circuits.

Description of the Related Art

Deep neural networks are often used to learn or identify complex patterns in data. The processing associated with deep neural networks may often involve a large number of vector-matrix multiplications (VMMs). However, performing or computing the large number of VMMs using traditional computing systems may demand an extensive amount of time and other resources.

Hardware acceleration circuits, such as compute-in-memory (CIM) circuits, may accelerate performance of the VMMs and corresponding calculations by reducing required data transfers within the system, such as between a memory circuit and a processor. Instead, the CIM circuits may perform processing of stored data in the memory circuit. In particular, analog CIMs (ACIMs) employing storage class memory (such as magnetoresistive RAM (MRAM), phase-change memory (PCM), resistive RAM (RRAM), and the like) may enable the efficient computing of VMMs with high throughput and improved energy efficiency as compared to traditional processing.

However, ACIMs may experience degradation during operations, such as due to read and/or write operations as well as time. Such degradation may reduce accuracy of calculations performed by the ACIMs. Thus, systems and methods to prevent and compensate for degradation in ACIMs are needed.

SUMMARY OF THE DISCLOSURE

Certain embodiments provide a device for performing compute in memory (CIM) computations. The device comprises a compute in memory (CIM) module configured to apply a plurality of analog weights to input data using at least one multiply-accumulate operation to generate an output. The device further comprises a digital weight storage unit configured to store a plurality of digital weight references. A digital weight reference of the plurality of digital weight references corresponds to an analog weight of the plurality of analog weights. The device also comprises a device controller configured to: program the plurality of analog weights to the CIM module based on the plurality of digital weight references; cause the CIM module to process the input data; determine that one or more analog weights of the plurality of analog weights is degraded; reprogram the one or more analog weights of the plurality of analog weights that are degraded based on corresponding digital weight references stored in the digital weight storage unit. The plurality of digital weight references in the digital weight storage unit are populated with values from a host processing device. Degraded analog weights in the CIM module are reprogrammed based on the corresponding digital weight references from the digital weight storage unit without reference to the host processing device.

Certain other embodiments provide a method for performing compute in memory (CIM) computations. The memory comprises applying a plurality of analog weights to process input data via a compute in memory (CIM) module using at least one multiply-accumulate operation to generate an output and storing, via a digital weight storage unit, a plurality of digital weight references, wherein a digital weight reference of the plurality of digital weight references corresponds to an analog weight of the plurality of analog weights. The method further comprises programming the plurality of analog weights to the CIM module based on the plurality of digital weight references via a device controller. The method additionally comprises causing the CIM module to process the input data; determining that one or more analog weights of the plurality of analog weights is degraded and reprogramming the one or more analog weights of the plurality of analog weights that are degraded based on corresponding digital weight references stored in the digital weight storage unit. The plurality of digital weight references in the digital weight storage unit are populated with values from a host processing device. Degraded analog weights in the CIM module are reprogrammed based on the corresponding digital weight references from the digital weight storage unit without reference to the host processing device.

Certain additional embodiments provide a device for performing compute in memory (CIM) computations. The device comprises a compute in memory (CIM) module configured to apply a plurality of analog weights to input data using at least one multiply-accumulate operation to generate an output. The device further comprises a digital weight storage unit configured to store a plurality of digital weight references, wherein a digital weight reference of the plurality of digital weight references corresponds to an analog weight of the plurality of analog weights. The device also comprises a device controller configured to program the plurality of analog weights to the CIM module based on the plurality of digital weight references, and determine that one or more analog weights of the plurality of analog weights is degraded. The plurality of digital weight references in the digital weight storage unit is populated with values from a host device. Degraded analog weights in the CIM module are replaced with corresponding digital weight references from the digital weight storage unit without reference to the host device.

Certain other embodiments provide method comprising processing input data, via a compute in memory (CIM) module, with a plurality of analog weights according to at least one multiply-accumulate operation to generate an output, storing a plurality of digital weight references in a digital weight storage unit, wherein a digital weight reference of the plurality of digital weight references corresponds to an analog weight of the plurality of analog weights; programming, via a device controller, the plurality of analog weights to the CIM module based on the plurality of digital weight references; and determining, via the device controller, that one or more analog weights of the plurality of analog weights is degraded. The plurality of digital weight references in the digital weight storage unit is populated with values from a host device. Degraded analog weights in the CIM module are replaced with corresponding digital weight references from the digital weight storage unit without reference to the host device Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
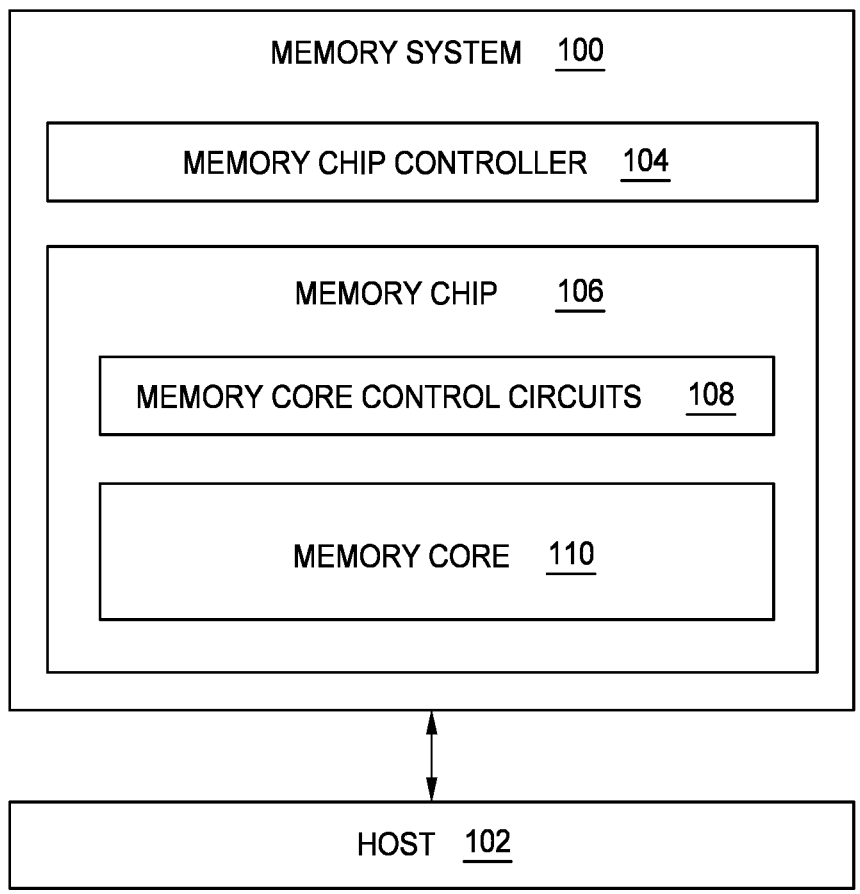
FIG. 1A depicts an example embodiment of a memory system and a host.

Aspects of the present disclosure provide apparatuses, methods, processing systems, and computer-readable mediums for improving the performance of compute in memory (CIM) operations, such as may be performed by analog compute in memory (ACIM) circuits.

Machine learning (ML) models provide state-of-the-art performance for many tasks and are thus being deployed more often on more device types. However, processing machine learning model data is computationally and data-intensive. For example, performing ML model computations with a traditional host-computing device can incur high resource and performance overhead related to moving large amounts of data from system memory to a processor, such as a central processing unit (CPU), a graphics processing unit (GPU), or the like, and back again. This movement of the data drives performance and energy overhead that reduces efficiencies of using traditional host-computing device architectures for ML model processing.

Memory is emerging as a processing alternative to conventional host processing architectures. Beneficially, processing ML model data in memory (so-called compute-in-memory or CIM) can reduce data movement and, as a result, reduce energy use and latency compared to conventional processing architectures. CIM architectures help to overcome the so-called "memory wall" problem of conventional processing architectures.

An analog compute-in-memory (ACIM) circuit (or accelerator) is one type CIM architecture that can be used for efficiently processing ML model data. Beneficially, ACIMs may be based on a storage class memory (SCM), such as magnetoresistive RAM (MRAM), phase-change memory (PCM), resistive RAM (RRAM), and the like. Aspects described herein use ACIM circuits as one example, though other kinds of computer-in-memory architectures can be used as well with similar benefits.

Generally, when employing an ACIM circuit, a digital-to-analog convertor (DAC) converts digital values to corresponding analog values for processing by analog memory cells of the ACIM circuit. Many memory cells may be combined to perform simultaneous multiplication and accumulation (MAC) operations so that ML model data may be rapidly processed in parallel.

ACIM circuits may suffer from performance degradation based on various operational characteristics, such the number of read and write operations or the time since programming. Further, intrinsic characteristics of memory cells, such as manufacturing variations between the memory cells, may lead to performance degradation. Once the accuracy falls below a threshold value, the outputs generated by the ACIM circuit can become problematic for the operation of an ML task, such as inferencing or training.

A conventional way of addressing the degradation of an ACIM circuit involves storing values for the ACIM circuit remotely (e.g., in a host system memory, which is remote from the memory device) and periodically checking, and if necessary rewriting the values to the ACIM circuit. For example, in the context of a ML model, the ACIM may be programmed with weight values for a model, and a master version of the weights may be stored in a remote memory of the host processing system. Such as scheme may be referred to as a collaborative system because the host processing system collaborates with the memory device comprising the ACIM circuit to maintain weights values used by the ACIM circuit. However, by nature, such collaborative schemes increase data movements between the host processing system and the ACIM circuit, which cuts against one of the primary advantages of CIM systems generally—reduction in data movement.

Aspects of the present disclosure provide a solution to the accuracy degradation problem without relying on a host computing system to maintain model parameters in an ACIM, and thus improve upon conventional approaches by saving data movement overhead and unnecessary host system processing. In particular, architectures described herein enables a memory device comprising an ACIM circuit to maintain values stored in the ACIM (e.g., ML model weights) without on-going collaboration by a host processing system.

In some examples described herein, a memory device includes an ACIM circuit, a digital weight storage unit (DWSU) separate from the ACIM circuit, and a controller configured to enable interaction between the ACIM and DWSU so that ACIM degradation can be detected and mitigated all within the device without host processing system collaboration. Using the memory device controller and DWSU, the memory device can locally determine when the ACIM circuit degrades beyond a threshold level and overwrite the values in the ACIM circuit with stored values from the DWSU. Because the DWSU is local to and/or tightly coupled with the ACIM circuit (for example, is part of the device comprising the ACIM circuit), the energy and time resources required to identify the degradation of the ACIM circuit and to overwrite the weights in the ACIM circuit with the values stored in the DWSU are significantly reduced as compared to collaborative systems requiring the host system to be involved, as described above.

In some embodiments, the tight coupling of the DWSU with the ACIM circuit may improve performance by reducing movement of data, such as the weights in the ACIM circuit. Thus, the aspects described herein may reduce resource consumption of computing systems that employ CIM accelerators managed and/or maintained by a host system by making the CIM accelerators (and the corresponding memory devices) more independent from the host system.

Example System for Multiplication Using Memory Cells

FIG. 1A depicts one embodiment of a memory system 100 and a host 102. Memory system 100 may include a non-volatile storage system interfacing with host 102 (e.g., a mobile computing device). In some cases, memory system 100 is embedded within host 102. In other cases, memory system 100 includes a memory card.

As depicted, memory system 100 includes a memory chip controller 104 and a memory chip 106. Although a single memory chip 106 is depicted, memory system 100 may include more than one memory chip (e.g., four, eight or some other number of memory chips). Memory chip controller 104 may receive data and commands from host 102 and provide memory chip data to host 102. In one embodiment, memory system 100 is used as a neuromorphic computing system.

Memory chip controller 104 may include one or more state machines, page registers, SRAM, and control circuitry for controlling the operation of memory chip 106. The one or more state machines, page registers, SRAM, and control circuitry for controlling the operation of memory chip 106 may be referred to as managing or control circuits. The managing or control circuits may facilitate one or more memory array operations, such as forming, erasing, programming, reading, or sensing operations. The managing or control circuits are used to perform multiplication using non-volatile memory cells, in one embodiment. Herein, multiplication will be referred to as a type of memory array operation.

In some embodiments, the managing or control circuits (or a portion of the managing or control circuits) for facilitating one or more memory array operations (including multiplication) may be integrated within memory chip 106. Memory chip controller 104 and memory chip 106 may be arranged on a single integrated circuit. In other embodiments, memory chip controller 104 and memory chip 106 may be arranged on different integrated circuits. In some cases, memory chip controller 104 and memory chip 106 are integrated on a system board, logic board, or a PCB.

Memory chip 106 includes memory core control circuits 108 and a memory core 110. Memory core control circuits 108 may include logic for controlling the selection of memory blocks (or arrays) within memory core 110, controlling the generation of voltage references for biasing a particular memory array into a read or write state, or generating row and column addresses. Memory core control circuits 108 may include logic for controlling the generation of voltage references for biasing a particular memory array in order to perform multiplication using non-volatile memory cells.

Memory chip controller 104 controls operation of memory chip 106. Once a read, write, or multiply operation is initiated by memory chip controller 104, memory core control circuits 108 may generate the appropriate bias voltages for bit lines, source lines and/or word lines within memory core 110, and generate the appropriate memory block, row, and column addresses.

In some embodiments, one or more managing or control circuits may be used for controlling the operation of a memory array. The one or more managing or control circuits may provide control signals to a memory array to perform a read operation, a write operation and/or a multiply operation on the memory array. In one example, the one or more managing or control circuits may include any one of or a combination of control circuitry, state machine, decoders, sense amplifiers, read/write/multiply circuits, and/or controllers. The one or more managing circuits may perform or facilitate one or more memory array operations including erasing, programming, reading operations, or multiply operations. In one example, one or more managing circuits may include an on-chip memory controller for determining row and column address, bit line, source line and word line addresses, memory array enable signals, and data latching signals.

Memory core 110 may include one or more two-dimensional arrays of memory cells or one or more three-dimensional arrays of memory cells. In one embodiment, memory core control circuits 108 and memory core 110 are arranged on a single integrated circuit. In other embodiments, memory core control circuits 108 (or a portion of memory core control circuits 108) and memory core 110 may be arranged on different integrated circuits.

In one embodiment, memory core 110 comprises a three-dimensional memory array of non-volatile memory cells in which multiple memory levels are formed above a single substrate, such as a wafer. The memory structure may comprise any type of non-volatile memory that are monolithically formed in one or more physical levels of arrays of memory cells having an active area disposed above a silicon (or other type of) substrate.

The exact type of memory array architecture or memory cell included in memory core 110 is not limited to the examples above. Many different types of memory array architectures or memory technologies can be used to form memory core 110. No particular non-volatile memory technology is required for purposes of the new claimed embodiments proposed herein. Other examples of suitable technologies for memory cells of the memory core 110 include ReRAM memories, ferroelectric field effect transistor (FeFET) memory, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory core 110 include two-dimensional arrays, three-dimensional arrays, cross-point arrays, stacked two-dimensional arrays, vertical bit line arrays, and the like.

One example of a ReRAM, or PCMRAM, cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage, light, or other wave.

A ferroelectric field effect transistor (FeFET) memory has an adjustable threshold voltage (Vt) transistor that has an adjustable threshold voltage. The adjustable Vt transistor has a low threshold voltage state and a high threshold voltage state, in one embodiment. The adjustable Vt transistor can be repeatedly switched between the low threshold voltage state and the high threshold voltage state.

A person of ordinary skill in the art will recognize that the technology described herein is not limited to a single specific memory structure, but covers many relevant memory structures within the spirit and scope of the technology as described herein and as understood by one of ordinary skill in the art.

Figure 1B:
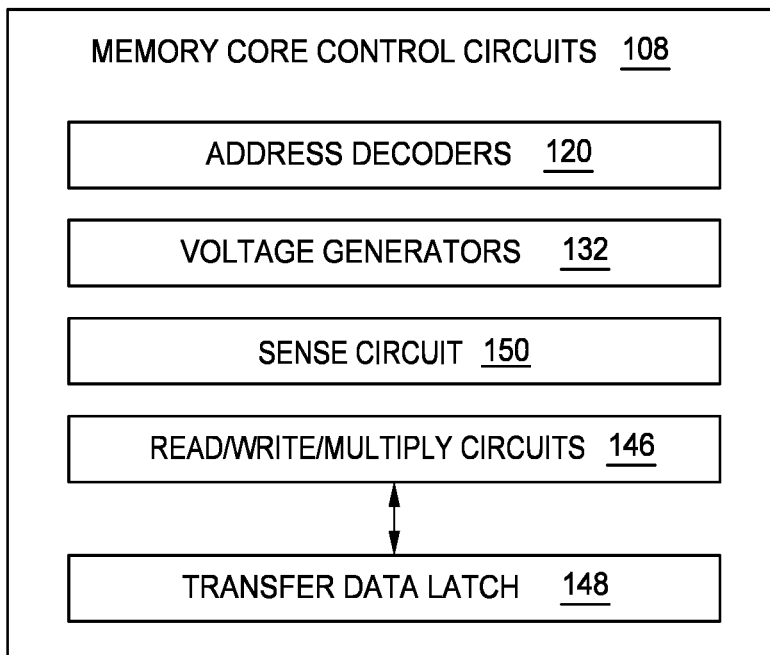
FIG. 1B depicts an example embodiment of memory core control circuits.

FIG. 1B depicts an embodiment of memory core control circuits 108. As depicted, memory core control circuits 108 include address decoders 120, voltage generators 132, transfer data latch 148, read/write/multiply circuits 146, and sense circuit 150. The voltage generators (or voltage regulators) 132 may generate voltages for control lines.

Read/write/multiply circuits 146 include circuitry for reading and writing memory cells in the memory core 110. In an embodiment, transfer data latch 148 is used for intermediate storage between memory chip controller 104 (FIG. 1A) and memory cells. In an embodiment, when host 102 instructs memory chip controller 104 to write data to memory chip 106, memory chip controller 104 writes host data to transfer data latch 148. Read/write circuits 146 then write data from transfer data latch 148 to a specified page of memory cells. In an embodiment, transfer data latch 148 has a size equal to the size of a page. In an embodiment, when host 102 instructs memory chip controller 104 to read data from memory chip 106, read/write circuits 146 read from a specified page into transfer data latch 148, and memory chip controller 104 transfers the read data from transfer data latch 148 to host 102. Address decoders 120 may generate memory block addresses, as well as row addresses and column addresses for a particular memory block.

The read/write/multiply circuits 146 also include circuitry for performing multiply operations using memory cells. In one embodiment, the write circuit is used to store multiplicands in the memory cells. The write circuit stores a multiplicand into a node of "r" memory cells, in one embodiment. In one embodiment, the multiplicand has "r" bits. Each memory cell in a node stores one of the "r" bits of the multiplicand, in one embodiment.

In one embodiment, the multiply circuit is used to apply multiply voltages to memory cells that store multiplicands. Each multiply voltage has a magnitude that represents a multiplier, in one embodiment. Each memory cell in a node passes memory cell current in response to the multiply voltage. The magnitude of the memory cell current depends on the physical state of the memory cell and a magnitude of the multiply voltage, in one embodiment. For example, the magnitude of a memory cell current depends on the resistance of the memory cell and the voltage applied to the memory cell, in one embodiment. The magnitude of the memory cell current depends on whether the memory cell is in a first physical state or a second physical state, in one embodiment. Each physical state may be represented by a physical parameter including, but not limited to, a memory cell resistance, or a memory cell transistor threshold voltage.

The multiply voltage may be similar in magnitude to a read voltage, in that the multiply voltage may cause the memory cell to pass the memory cell current without changing the physical state of the memory cell. However, whereas a read voltage may have a magnitude that is selected to delineate between physical states, the magnitude of the multiply voltage is not necessarily selected to delineate between physical states. After a read voltage is applied, the memory cell current may be sensed and compared with a reference current to determine a state of the memory cell. In this case, the magnitude of the read voltage and reference current may be selected to be able to delineate between the two states. However, the multiply voltage could have one of many different magnitudes, depending on what multiplier is desired. Moreover, the memory cell current that outputs from applying the multiply voltage is not necessarily compared to a reference current.

The sense circuit 150 is configured to sense the memory cell currents. The sense circuit 150 comprises a number of sense amplifiers, in one embodiment. A sense amplifier is used to sense a current in a bit line, in one embodiment. In some embodiments, a number of memory cells are connected to the same bit line. Depending on how voltages are applied to the memory cells by the read or multiply circuit, the current from one or more memory cells may flow in the bit line. Thus, a sense amplifier may be used to sense the memory cell current from a single memory cell, or the combined memory cell current from multiple memory cells connected to the same bit line. The sense amplifier may also be configured to compare the magnitude of the bit line current to the magnitude of a reference current.

Figure 1C:
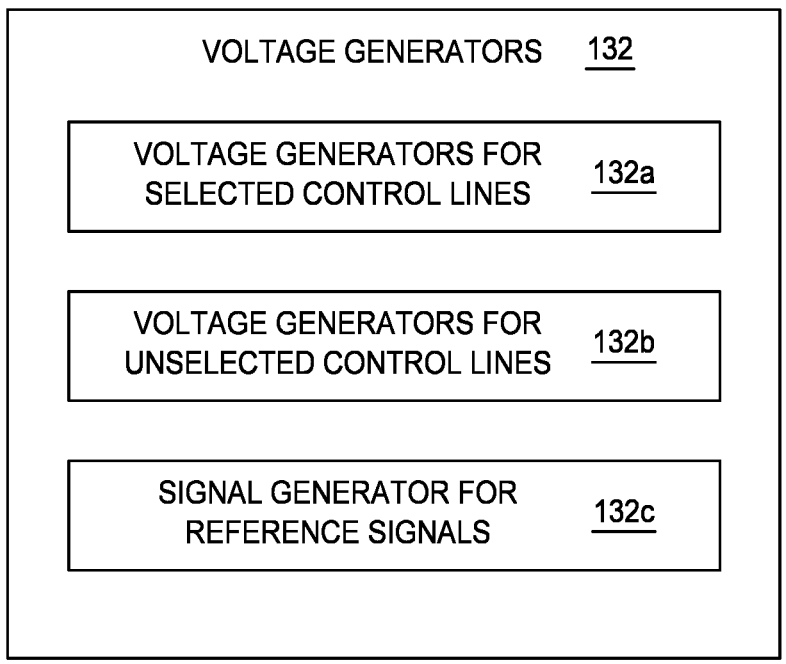
FIG. 1C depicts further details of an example embodiment of voltage generators.

FIG. 1C depicts further details of one embodiment of voltage generators 132. The voltage generators include voltage generators for selected control lines 132a, voltage generators for unselected control lines 132b, and signal generators for reference signals 132c. Control lines may include bit lines, source lines and word lines, or a combination of bit lines, source lines and word lines. Voltage generators for selected control lines 132a may be used to generate program, read, and/or multiply voltages. In one embodiment, the voltage generators for selected control lines 132a generate a voltage whose magnitude is based on a multiplier for a mathematical multiplication operation. In one embodiment, the voltage difference between the voltages for two selected control lines is a multiply voltage.

Voltage generators for unselected control lines 132b may be used to generate voltages for control lines that are connected to memory cells that are not selected for a program, read, or multiply operation. The signal generators for reference signals 132c may be used to generate reference signals (e.g., currents, voltages) to be used as a comparison signal to determine the physical state of a memory cell.

Example Artificial Neural Network and Corresponding Memory Cell Multiplication

Figure 2A:
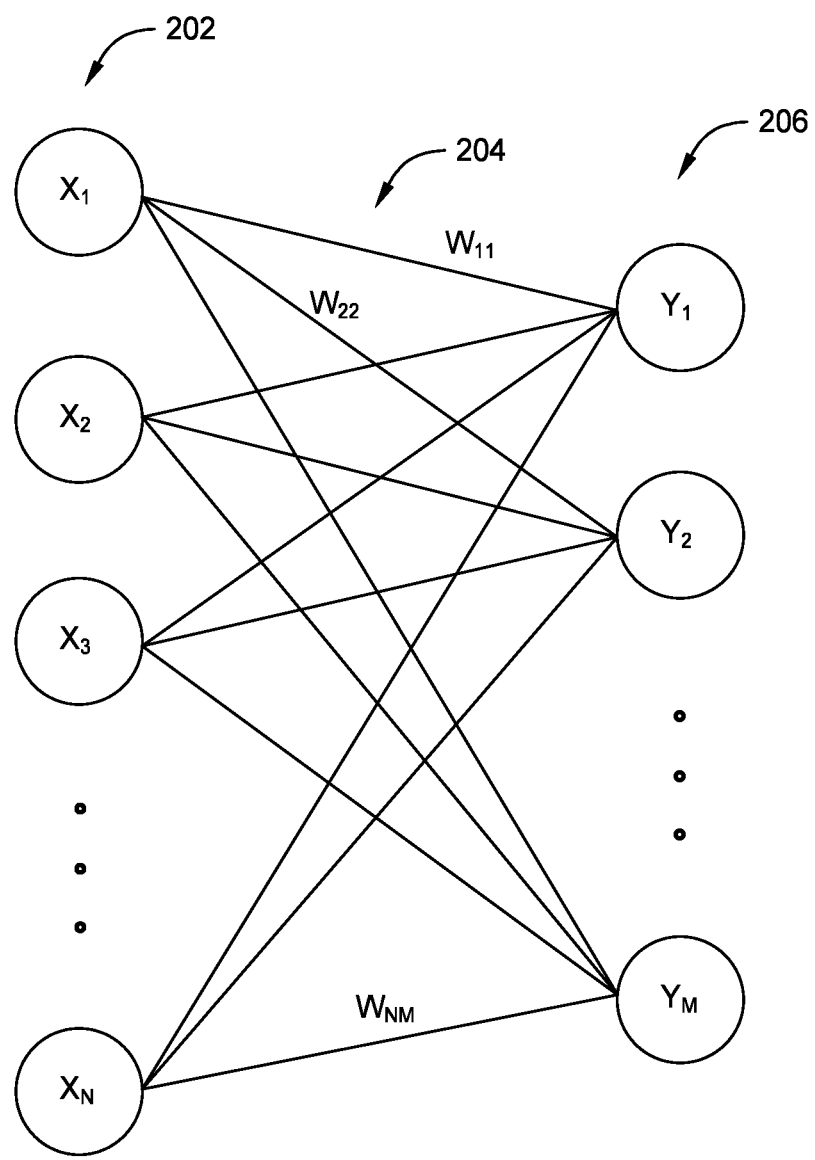
FIG. 2A shows an example of an artificial neural network.

In one embodiment, non-volatile memory cells are used to perform multiplication for an artificial neural network. FIG. 2A shows an example of an N to M artificial neural network 200, where "N" refers to the number of input neurons 202 and "M" refers to the number of output neurons 206. A number of synapses 204 connect input neurons 202 to output neurons 206. Each of the input neurons 202 may be associated with a mathematical value. Likewise, each of the synapses 204 may be associated with a mathematical value, which is typically referred to as a "weight." Equation 1 represents a calculation that may be performed for each of the "M" output neurons 206.

$$Y_M = \Sigma_1^N X_N \times W_{NM} \qquad (1)$$

In Equation 1, $Y_M$ represents the output neuron 206 for which Equation 1 is presently being applied; $X_N$ represents the input neurons 202; and $W_{NM}$ represents the weight of the synapse 204 that connects one input neuron 202 to the output neuron 206 for which Equation 1 is presently being applied ($Y_M$). As noted above, each synapse has a "weight". Thus, Equation 1 may be implemented by a multiplication and accumulation (or MAC operation) of the product of the values of the N input neuron 202 by the weight of the synapse 204 that connects each respective input neuron 202 to $Y_M$. The MAC operation can also be referred to as a vector/vector multiplication (e.g., dot product of two vectors). The first vector being an "n" element vector defined by the values for the N input neurons 202, and the second vector being an "n" element vector defined by the weights of the N synapses 204 that connect the N input neurons 202 to output neurons $Y_M$.

Figure 2B:
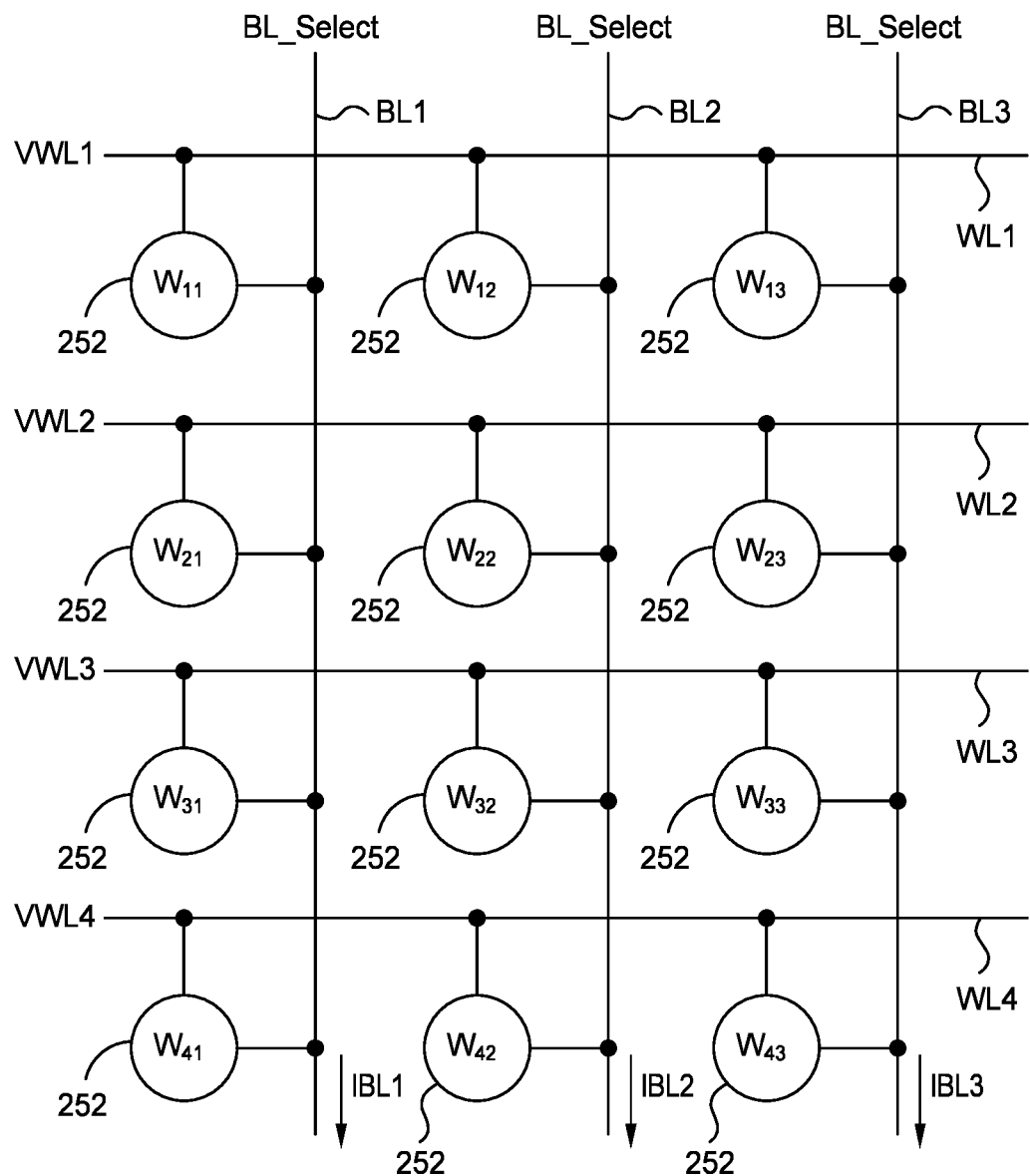
FIG. 2B depicts an example of a portion of a cross-point memory array.

One technique for performing the multiply and accumulate (or vector/vector multiply) is to use a cross-point memory array. FIG. 2B depicts an example of a portion of a cross-point memory array 250. The cross-point memory array 250 may be used to perform a multiply and accumulate operation. The depicted portion of the array 250 has four word lines (WL1, WL2, WL3, WL4) and three bit lines (BL1, BL2, BL3). The depicted portion of the array 250 may be used to execute Equation 1 for a case in which N=4 and M=3 (assuming binary weights in this example).

A number of non-volatile memory cells 252 are depicted. Each non-volatile memory cells 252 may include an adjustable resistor, as one example. Each memory cell 252 is labeled with a weight (e.g., $W_{11}$, $W_{21}$, etc.). These weights ($W_{NM}$) correspond to the weights that represent the synapses 204 that connects one input neuron 202 to the output neuron 206. For some types of memory cells, the adjustable resistor can be programmed to a range of resistances. Thus, the weight may be related to the resistance of the adjustable resistor.

Voltages VWL1, VWL2, VWL3, and VWL4 are shown being applied to the respective word lines WL1, WL2, WL3, WL4. The magnitudes of these voltages correspond to the input neurons 202. Thus, the set of voltages VWL1, VWL2, VWL3, and VWL4 correspond to $X_N$ in Equation 1. A bit line select voltage (BL_Select) is applied to each bit line to select that bit line. For ease of explanation, it will be assumed that BL_Select is zero volts, such that the voltage across each memory cell 252 is the word line voltage. Each memory cell 252 may pass a current that is based on its resistance and the voltage applied to the memory cell. This "memory cell current" flows to the bit line connected to the memory cell 252. The memory cell current may be viewed as the product of multiplying a mathematical value represented by the word line voltage by a mathematical value represented by the resistance of the memory cell. Stated another way, the memory cell current may be viewed as a representation of the product of multiplying one of the elements of an input vector by the weight stored in the memory cell.

A number of bit line currents (IBL1, IBL2, IBL3) are depicted. Each bit line current is the summation of the currents of the memory cells connected to that bit line. Thus, each bit line current may be viewed as representing an accumulation of the products discussed above. Therefore, the magnitude of a bit line current may be viewed to represent a vector/vector multiplication (e.g., dot product of two vectors). Furthermore, with reference to Equation 1, the magnitude of a bit line current may represent one of the output neurons (e.g., $Y_M$). Other examples may use other configurations, such as charge accumulation rather than current, in order to determine a mathematical operation of the cell array.

Analog Compute in Memory (ACIM) Accelerators

Figure 3A:
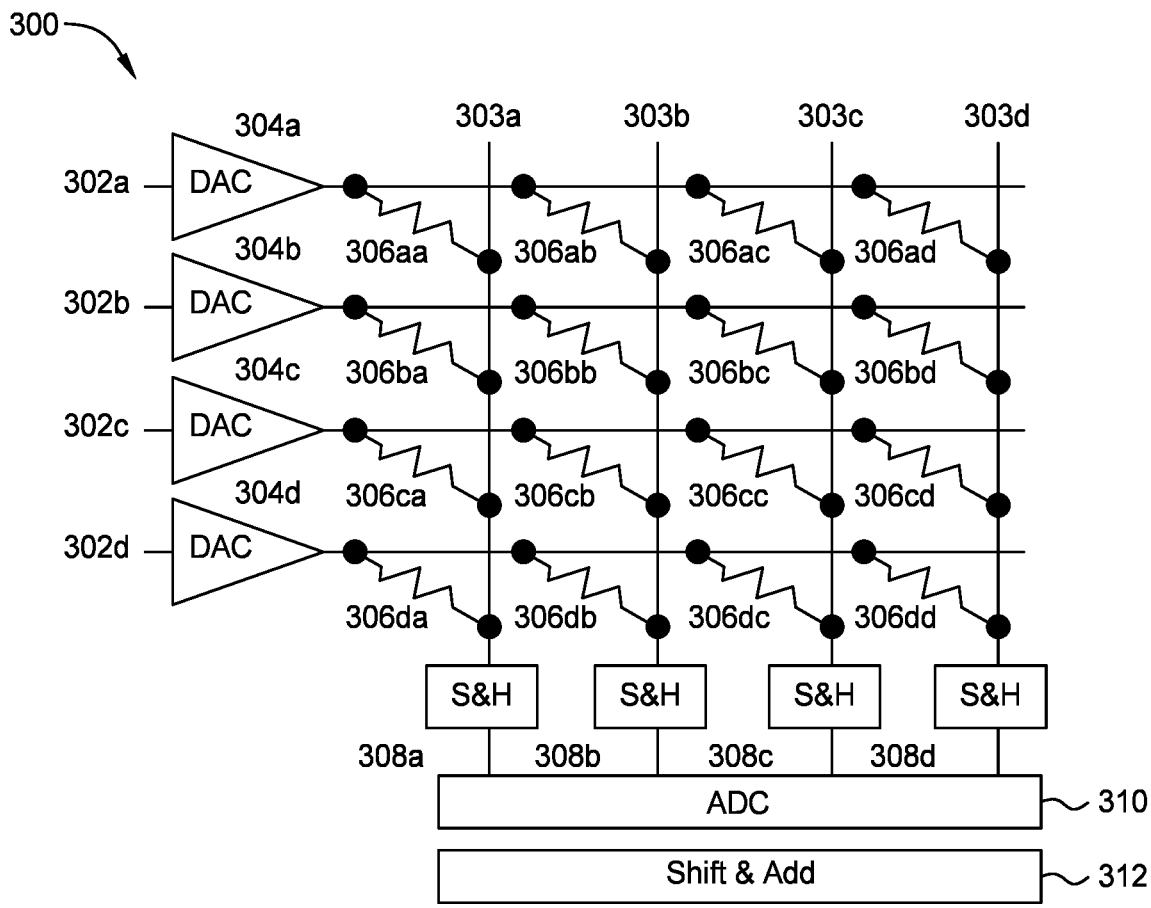
FIGS. 3A and 3B show details of a resistive memory cell array corresponding to the portion of the cross-point memory array of FIG. 2B, according to an exemplary embodiment.
Figure 3B:
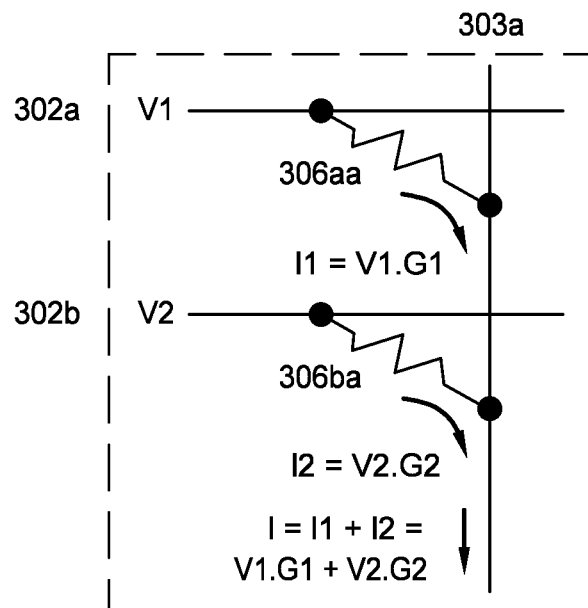

FIGS. 3A and 3B show details of a resistive memory cell array 300 corresponding to the portion of the cross-point memory array 250 of FIG. 2B that implements an ACIM circuit.

The memory cell array 300 of FIG. 3A depicts a plurality of voltage word lines 302a-302d (corresponding to the word lines WL of FIG. 2B) that feed a plurality of digital-to-analog (DAC) converters 304a-304d. The voltage word lines 302a-302d are connected to a plurality of selection bit lines 303a-d (corresponding to the bit lines BL of FIG. 2B) via resistive memory cells 306aa-306dd (corresponding to the memory cell 252 of FIG. 2B). In addition to the word lines 302a-302d, the selection bit lines 303a-d, and the memory cells 306aa-306dd, the memory cell array 300 further includes sample and hold circuits 308a-308d for each selection bit line 303a-d, an analog-to-digital converter (ADC) 310, and a shift and add circuit 312.

The voltage word lines 302a-d, selection bit lines 303a-d, and resistive memory cells 306aa-306dd may operate similar to their respective FIG. 2B components, as described above. The sample and hold circuits 308a-308d and the ADC 310 may work together to accurately convert the analog values received and passed by the sample and hold circuit 308a-308d to digital values for sharing with other circuits, such as the shift and add circuit 312.

FIG. 3B provides details of an example multiply and accumulate operation along the bit line 303a for two word lines 302a and 302b using the memory cells 306aa and 306ba. Specifically, as introduced above, an input voltage applied to the word line 302a is multiplied by the weight stored in the memory cell 306aa to generate an output current that is based on the resistance of and the voltage applied to the memory cell. Where the input voltage applied to the word line 302a is represented by V1 and the weight of the memory cell 306aa is represented by G1, the output current I1 generated by the memory cell 306aa is I1=V1*G1. Similarly, an input voltage applied to the word line 302b is multiplied by the weight stored in the memory cell 306ba to generate an output current that is based on the resistance of and the voltage applied to the memory cell. Where the input voltage applied to the word line 302b is represented by V2 and the weight of the memory cell 306ab is represented by G2, the output current I2 generated by the memory cell 306ab is I2=V2*G2. The individual currents output by the memory cells 306aa and 306ab along the bit line 303a are added to generate a bit line output current I, which may represent an output of the model implemented by the memory cell array 300.

Model Degradation in Analog Compute in Memory (ACIM) Accelerators

In some embodiments, an ACIM circuit may comprise or employ a structure of memory elements similar to the memory cell array 300 described with respect to FIGS. 3A and 3B. As introduced above, the ACIM circuit may degrade over time, for example, due to extrinsic factors, such as the number of operations performed by the circuit, random noise, environmental factors (e.g., temperature), as well as intrinsic factors, such as device variations between different memory cells in the array 300. FIGS. 4A-4D depict example graphs showing how the ACIM circuits (for example, corresponding to the ACIM circuit implemented by the memory cell array 300 of FIG. 3) experience accuracy degradation over time.

Figure 4A:
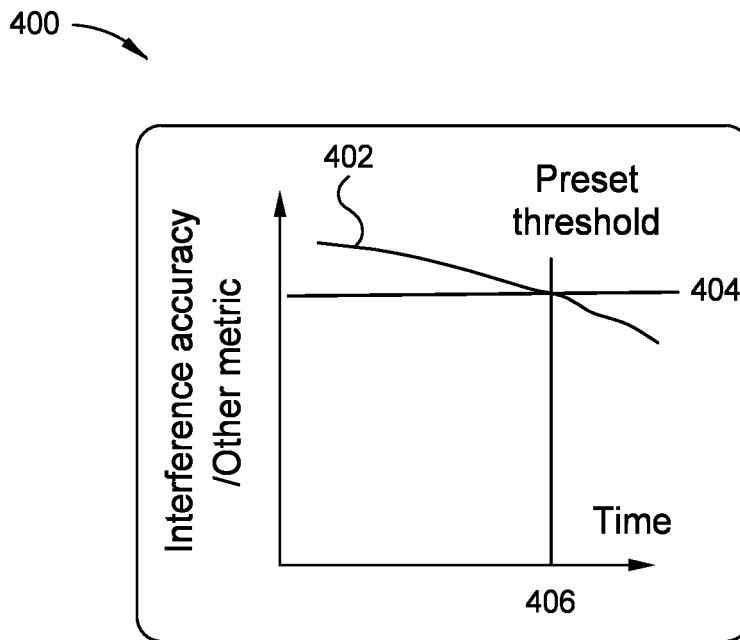
FIGS. 4A-4D depict graphs showing how the ACIM circuits (for example, corresponding to the ACIM circuit implemented by the memory cell array of FIG. 3) experience accuracy degradation, according to an exemplary embodiment.

FIG. 4A depicts a graph 400 identifying calculation accuracies of an ACIM circuit over time. Specifically, the graph 400 shows a trend line 402 for a plot of the calculation accuracies (along the Y-axis) as a function of time (along the X-axis). The graph 400 also identifies a threshold level 404 of calculation accuracy and a time 406 at which the trend line for the calculation accuracies crosses the calculation accuracy threshold level 404. Thus, the graph 400 shows how the calculation accuracy of the ACIM circuit degrades over time.

In some cases, the degradation of the ACIM circuit accuracy corresponds to degradation of one or more aspects of the ACIM circuit, which may correspond to a number of reads and/or write operations experienced by the ACIM circuit or degradation that the components of the ACIM circuit experience over a passage of time. Thus, degradation of the ACIM circuit accumulates over time as the operations and component degradation accumulate, causing the accuracy (or corresponding metrics) ACIM circuit to drop over that passage of time.

Figure 4B:
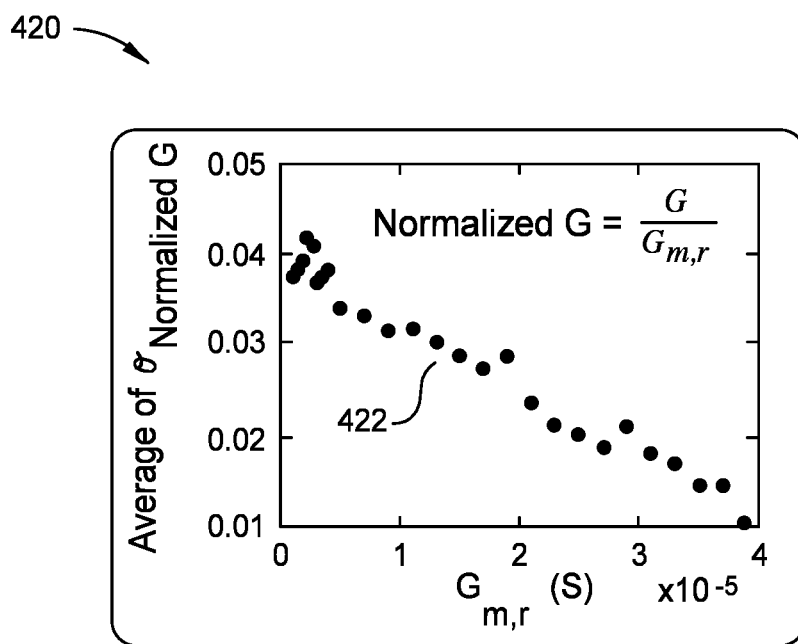

FIG. 4B depicts a graph 420 identifying read value fluctuation and/or instability in terms of a variation of conductance of the ACIM circuit. Specifically, the graph 420 shows a trend of values 422 for plotted averages of normalized conductance values (along the Y-axis) as a function of conductance values (along the X-axis). The graph 420 shows that as conductance values increase, the average of normalized conductance values decrease, thus identifying the fluctuation of normalized conductance values as the conductance values change. Example sources of read instability for the ACIM circuit can include conduction defects, thermal-fluctuation, and random telegraph noise, among others.

Figure 4C:
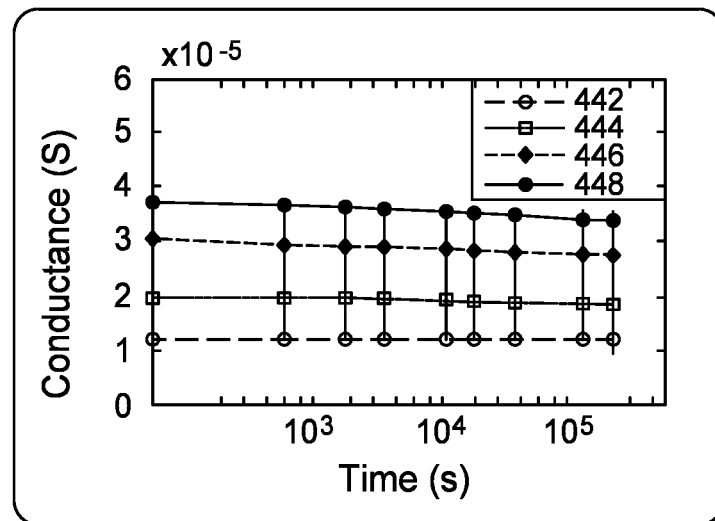

FIG. 4C depicts a graph 440 identifying a variation in data retention of the ACIM circuit. Specifically, the graph 440 shows trends (represented by trend lines 442-448) of conductance values (along the Y-axis), for example, of a memory cell as a function of time (along the X-axis). The graph 440 shows that the ACIM circuit experiences degradation or changing of the conductance values of the memory cells that causes the conductance values stored in the memory cells of the ACIM circuit to degrade or change, as shown by the trend lines 442-448 decreasing as time increases. In some embodiments, larger conductance values degrade or change more than smaller conductance values. The degradation of the conductance values in the ACIM circuit can further result in a reduction of the calculation accuracy of the ACIM circuit based on the degraded conductance values.

Figure 4D:
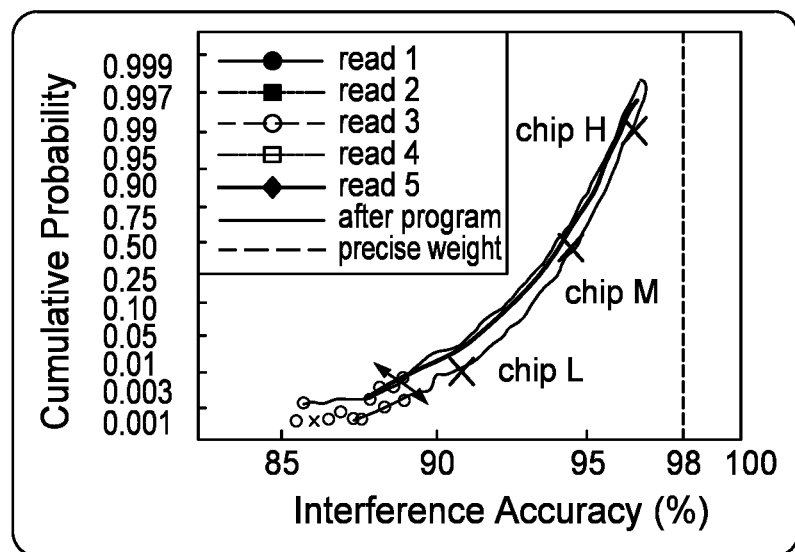

FIG. 4D depicts a graph 460 identifying a reduction of calculation accuracies of the ACIM circuit with corresponding dataset reads from the ACIM circuit. Specifically, the graph 460 shows cumulative probability values (along the Y-axis) for a number of reads from the ACIM circuit as a function of calculation accuracies (along the X-axis). The graph 460 shows that as the accuracy of the ACIM circuit falls, the cumulative probability of the ACIM circuit falls as well in a non-linear manner. Furthermore, a runtime calculation accuracy of various reads continuously drops as compared to a reference, or initial, accuracy for baseline weights. Furthermore, FIG. 4D shows that the different reads and reduced calculation accuracies result in reduced cumulative probabilities as compared to initial values. Accordingly, replacing the weights in the ACIM circuit with the baseline or reference weights (in other words, replacing the degraded conductance values that cause reduced calculation accuracies) may prevent the calculation accuracies of the ACIM circuit declining and, thereby, prevent erosion of the cumulative probabilities of the ACIM circuit.

FIGS. 4A-4D show that the calculation accuracies of the ACIM circuit and, thus, cumulative probabilities do degrade over time as the weights, or conductance values, of the ACIM accumulator degrade. However, such degradation can be countered or offset by overwriting or resetting the degraded weights and corresponding values with baseline or master model weight values.

Host-Based Weight Reset for ACIM Circuit

Figure 5:
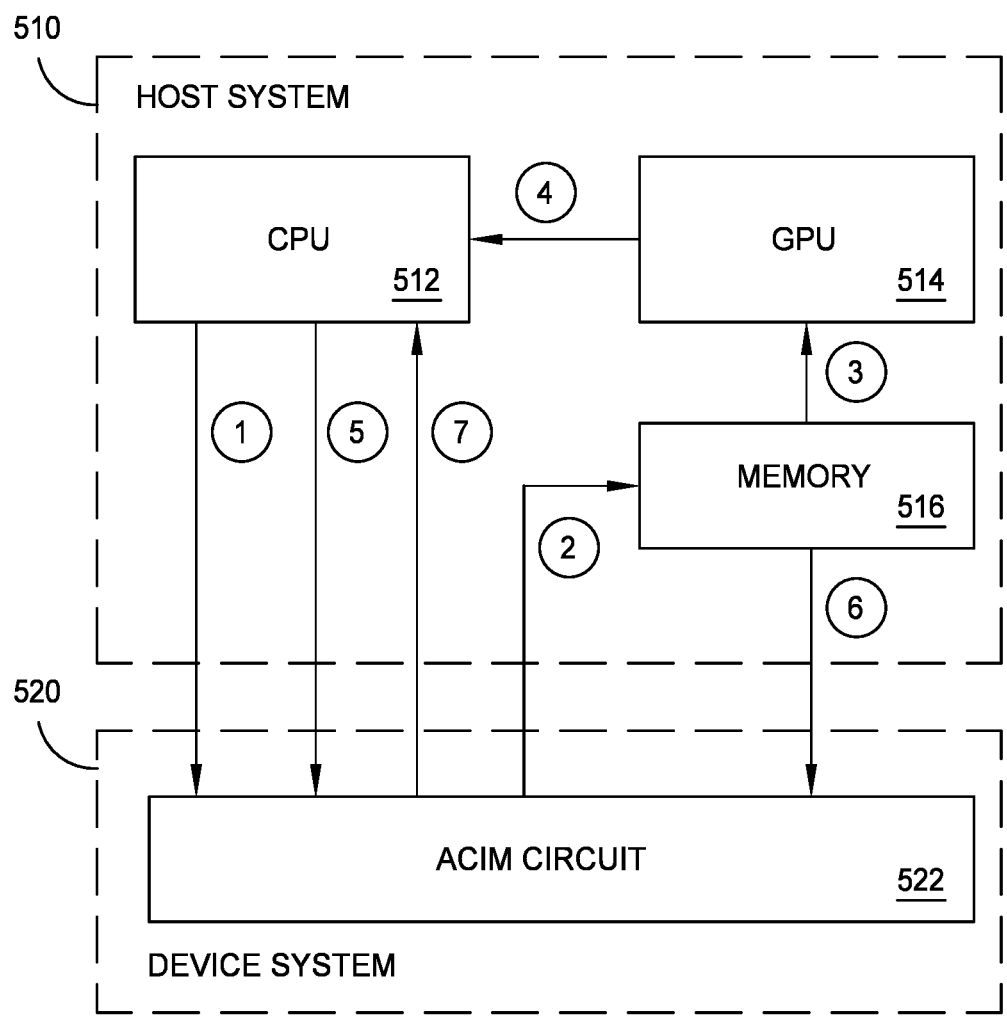
FIG. 5 provides a block diagram of a collaborative system comprising a host system working with a device system to correct degradation of an ACIM circuit hosted by the device system, according to an exemplary embodiment.

As introduced above, a host system can collaborate with a device system comprising an ACIM circuit to maintain values (e.g., model weights) used by the ACIM circuit for performing tasks, such as processing ML model data. FIG. 5 provides a block diagram of a collaborative system 500 comprising a host system 510 working with a device system 520 to detect and correct degradation of an ACIM circuit 522 hosted by the device system 520. The host system 510 in this example comprises a controller or processor (CPU) 512, a graphics processing unit (GPU) 514, and a memory 516. The memory 516 may correspond to a memory circuit used by one or more of the CPU 512 or the GPU 514 for storage of relevant data for processing. For example, the memory 516 stores data that the GPU 514 processes and CPU 512 manages storage and retrieval of the processed data. The device system 520 comprises the ACIM circuit 522, which as above is a memory circuit configured to perform compute-in-memory functions.

As noted above, an ACIM circuit such as 522 may exhibit accuracy degradation over time and with use, such as explained above with respect to FIGS. 4A-4D. The host system 510 may collaborate with ACIM circuit 522 to detect and correct the degradation of the ACIM circuit 522 by rewriting model weights stored in memory 516.

Where the host system 510 assists in correcting degradation of the ACIM circuit 522, the host system 510 may initially request the model values and weights stored or being processed by the ACIM circuit 522. Specifically, at communication 1, the CPU 512 of the host system 510 sends a command to the ACIM circuit 522 querying the model and weights stored and being processed by the ACIM circuit 522.

The ACIM circuit 522 may access the model and weights stored as analog values in the memory cell of the ACIM circuit 522. The ACIM circuit 522 may read out the analog values for the weights by applying, for example, input values of "1" to each weight such that the multiplication performed by the ACIM circuit 522 identifies the weight values for the ACIM circuit 522. The ACIM circuit 522 may send the model weights currently applied by the ACIM circuit 522 to the memory 516 of the host device 510 at communication 2.

The host system 510 processes the model weights received from the ACIM circuit 522. This comprises transferring the model weights applied by the ACIM circuit 522 from the memory 516 to the GPU 514 for calculations similar to what the ACIM circuit 522 performs on the model weights. Thus, at communication 3, the host system 510 can generate outputs corresponding to outputs generated by the ACIM circuit 522 applying the model weights.

At communication 4, the CPU 512 analyzes the outputs generated at communication 3. Specifically, the GPU 514 passes the generated outputs to the CPU 512 for comparison of the generated outputs with threshold values. The threshold values may be preset or provided by an operator. When the generated outputs fall below the threshold values, the CPU 512 may determine that the ACIM circuit 522 model weights are degraded. Thus, the threshold values may identify when or whether the model weights have degraded beyond a threshold amount.

At communication 5, when the CPU 512 determines that the model weights of the ACIM circuit 522 have degraded beyond the threshold amount, the CPU commands the ACIM circuit 522 to reset to baseline or initial model weight values (referred to herein interchangeably as baseline model weight values). In some embodiments, the baseline model weight values are stored in the memory 516 or a similar data store of the host system 510.

At communication 6, the ACIM circuit 522 retrieves the baseline model weight values from the memory 516. In some embodiments, the host system 510 provides updated model weight values in place of the baseline model weight values.

At communication 7, the ACIM circuit 522 applies (for example, via a write procedure) the retrieved baseline model weight values to the memory cell of the ACIM circuit. Thus, the host system 510 can reset the ACIM circuit 522 when the host system 510 identifies degradation of the ACIM circuit 522. The ACIM circuit 522 confirms the reset to the CPU 512 explicitly at communication 7.

Thus, conventional systems, such as described with respect to FIG. 5, incur significant data processing and movement overhead when collaborating between host system 510 and device system 520 to maintain values in ACIM circuit 522. Thus, the ACIM circuit 522 may hold the worst-case accuracy that can accumulate over time while the host system 510 holds the threshold accuracy. The host system 510 can query the worst-case accuracy from ACIM circuit 522 and compare the queried worst-case accuracy to the threshold accuracy in a period and decide if the ACIM circuit 522 needs to be re-programmed.

Local Weight Maintenance for ACIM Circuit

Figure 6A:
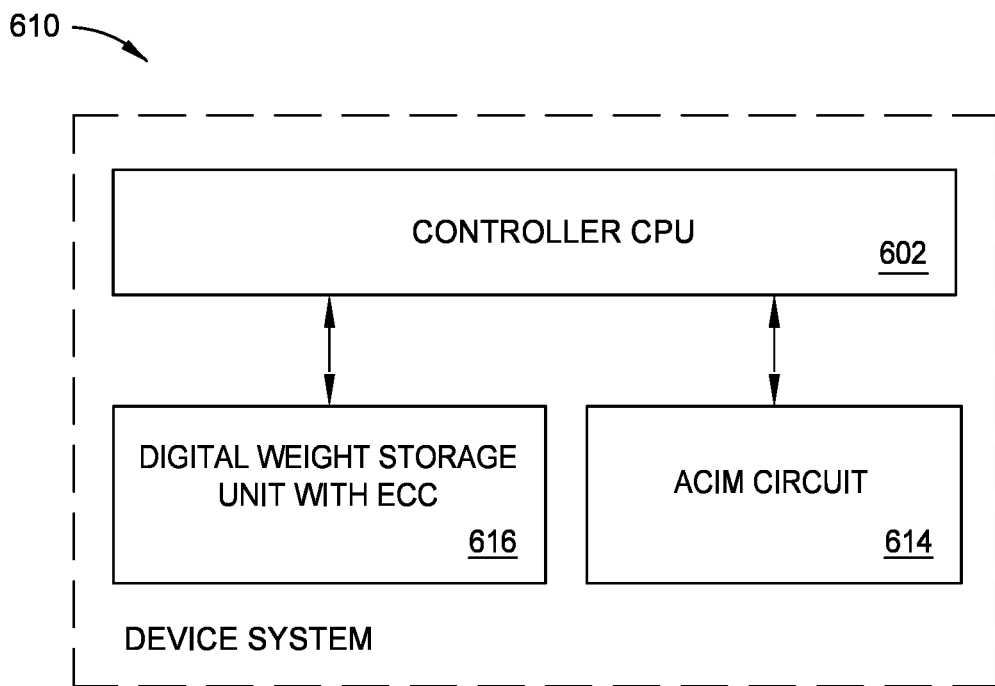
FIGS. 6A-6D depict block diagrams of components that form example device systems that implement an ACIM circuit and locally compensate for degradation of weights in the ACIM circuit.

FIG. 6A depicts a block diagram of components that form an example device system 610 that implements an ACIM circuit 614 and locally compensates for degradation of weights in the ACIM circuit 614. The device system 610 comprises a controller 602 that controls interactions between the components of the device system 610, the ACIM circuit 614, and a digital weight storage unit (DWSU) 616. In some embodiments, a communication bus (not explicitly shown) couples the components of the device system 610 such that the controller 602, the ACIM circuit 614, and the DWSU 616 are able to communicate and transfer data.

The controller 602 is in communication with each of and manages communications between the ACIM circuit 614 and the DWSU 616. In some embodiments, the controller may be representative of one or more central processing units (firmware CPUs), microcontrollers, field programmable gate arrays (FPGAs), application specific integrated circuits (ASICs), and/or the like. In some examples, the device system 610 the device system 610 is an edge device, a Universal Serial Bus (USB) data store, a peripheral component interconnect express (PCIE) device, a dual in-line memory module (DIMM), a peripheral circuit/device, and the like, dependent on where the ACIM circuit is implemented. The device 610 may be implemented as a standalone subsystem and/or as a board added to a host computing device and so forth.

The DWSU 616 may comprise a digital memory unit, or portion thereof, that stores a baseline set of weight values (also referred to herein as baseline weight values) for machine learning model data processed by the ACIM circuit 614. The baseline weight values may comprise the initial or optimized weight values for the machine learning model operations being performed by ACIM circuit 614, and may be stored as digital values accessible to the controller 602. The baseline weight values may correspond to the baseline or initial model weight values stored in the memory 516 of the host system 510 of FIG. 5.

By storing the baseline weight values in the device system 610, resource expensive movement of the weight values from an external system (for example, the host system 510 in FIG. 5) are not needed for correction of performance degradation in the ACIM circuit 614 because the baseline weight values are stored locally to device system 610.

Further details regarding storing the baseline weight values in the DWSU 616 are provided below.

The DWSU 616 may be tightly coupled to the controller 602 and the ACIM circuit 614. In some embodiments, the DWSU 616 may be located off-chip from the controller 602 and/or the ACIM circuit 614, for example, where the DWSU 616 is shared between multiple controllers 602 or ACIM circuits 614.

In some embodiments, the DWSU 616 comprises an error correction component configured to verify and ensure that the baseline weight values stored therein are correct and not suffering from degradation or errors. In some embodiments, the baseline weight values are stored in the DWSU 616 using an error correction code (ECC) or similar error detection and correction encoding or components.

The controller 602 comprises a processing component configured to execute code that causes the controller 602 to monitor the weight values being applied by the ACIM circuit 614 and determine whether the weight values applied by the ACIM circuit 614 have degraded beyond a threshold amount. Where the controller 602 determines that the weight values are degraded, the controller 602 resets or maintains the weight values of the ACIM circuit 614 to the baseline weight values, for example, overwriting the degraded weight values of the ACIM circuit 614.

The ACIM circuit 614 may correspond to the ACIM circuit 522 of FIG. 5. As such, the ACIM circuit 614 may perform multiply and accumulate operations based on, for example, input data and weight values associated with a machine learning model. The ACIM circuit 614 may comprise a plurality of analog memory cells, such as described above with respect to FIG. 3A. As introduced above, the weight values applied by or via the ACIM circuit 614 can degrade over time while performing the multiply and accumulate operations. However, the device system 610 can independently correct identified degradation of the ACIM circuit 614 weight values by resetting the ACIM circuit 614 weight values with the baseline weight values stored in the DWSU 616 without involvement of a host system.

Thus, where the controller 602 identifies that the ACIM circuit 614 weight values are degraded or that the accuracy of the ACIM circuit 614 has fallen below a threshold value, the controller 602 may reset the weight values in the ACIM circuit 614 based on the baseline weight values stored in the DWSU 616. In some embodiments, the controller 602 may access the DWSU 616 to obtain the baseline weight values for the ACIM circuit 614. Because the ACIM circuit 614 applies the weight values as analog values, the controller 602 converts the stored baseline weight values from digital values to analog values using a DAC (not shown in FIG. 6A). For example, the controller 602 accesses the baseline weight values stored in the DWSU 616, converts the accessed digital baseline weight values to analog values, and replaces corresponding weight values in the ACIM circuit 614 with the analog values.

ACIM Circuit Weight Storage Strategies

In some embodiments, the DWSU 616 is sized according to a quantity or size of the baseline weight values stored in the DWSU 616. For example, where the DWSU 616 is configured to store a value for each weight of the model processed by the ACIM circuit 614, the DWSU 616 may be sized sufficient to contain baseline weight values corresponding to each weight parameter of the model processed by the ACIM circuit 614. In some embodiments, the weight values are stored as 32-bit long floating-point values. Thus, the DWSU 616 storing the baseline weight values for the model processed by the ACIM circuit 614 having 1000 weight values would utilize at least 32,000 bits (32-bit floating point size*1000 weight values).

As the number of weight values applied by the ACIM circuit 614 increases, the size required for storage of corresponding baseline weight values in the DWSU 616 also increases. As such, the size of the DWSU 616 that stores the baseline weight values for the model processed by the ACIM circuit 614 may be proportional to the size of each weight value stored and a number of weight values stored. Therefore, either reducing the size of each weight value stored in the DWSU 616 or reducing a number of weight values stored in the DWSU 616, or both, enables reduction of the size of the DWSU 616, which may beneficially save space and power.

In embodiments where the DWSU 616 stores only a subset of weight values, a host device that provides the baseline weight values may load the DWSU 616 with the subset of weight values and load the ACIM circuit 614 with all of the weight values. Thereafter, the DWSU 616 may only maintain the weight values in the ACIM circuit 614 with the baseline weight values for the subset of weight values. The remaining weight values in the ACIM circuit 614 that are not maintained may be determined to minimally affect the system accuracy when degraded. In some embodiments, the system may determine the weight values that are not maintained, such as those that influence model output the least. In some embodiments, the host device may make such a determination when loading the DWSU 616 with the subset of weight values. In some embodiments, the DWSU 616 can be populated (initially with all baseline values and/or thereafter with all or a subset of values) by a third party, such as a memory vendor, and so forth. In such embodiments, the host can be unaware of the weight values for the DWSU 616 and the ACIM circuit 614.

Figure 6B:
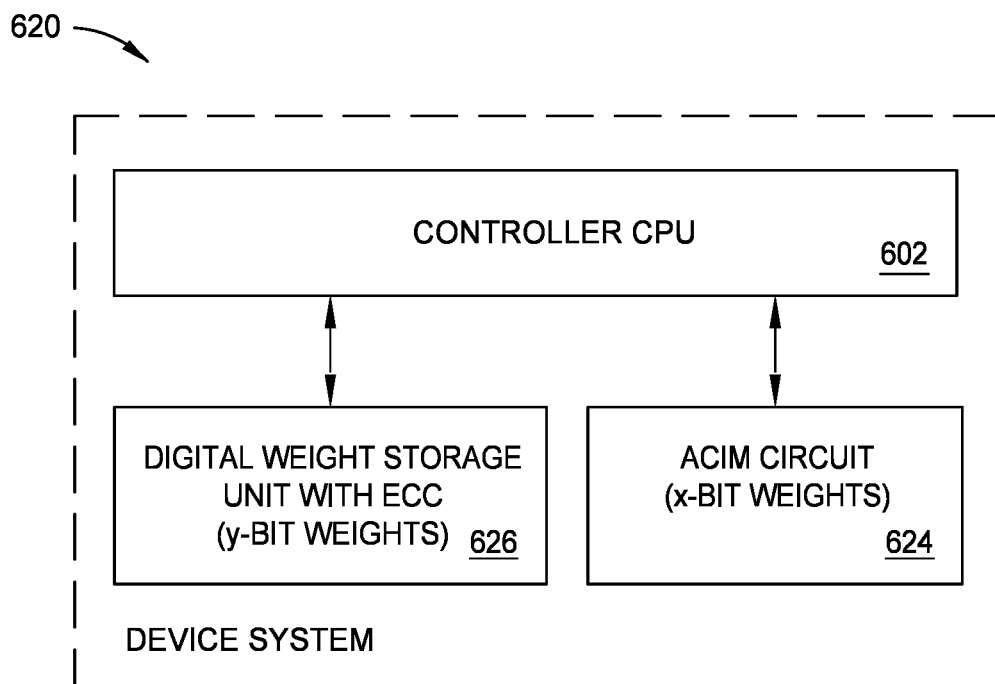

In some embodiments, a DWSU may store a quantized subset of bits for the baseline weight values. For example, FIG. 6B depicts the device system 620 comprising an ACIM circuit 624 configured to store weight values of x-bit length and a DWSU 626 configured to store quantized weight values, such as y-bit weight values. In some embodiments, a communication bus (not explicitly shown) couples the components of the device system 620 such that the controller 602, the ACIM circuit 624, and the DWSU 626 are able to communicate and transfer data. For example, in some embodiments, the model processed by the ACIM circuit 624 may be tolerant of quantization noise introduced by quantizing the full baseline weight values. By storing the quantized subset of bits instead of the full baseline weight values, the size of the DWSU 626 can be reduced.

In some embodiments, storing the quantized subset of bits comprises storing the most significant bit(s) (MSB(s)) for the baseline weight values in the DWSU 626. For example, the model processed by the ACIM circuit 624 may use x-bit length weight values instead of 32-bit floating point values. Thus, instead of storing the entire 32-bit floating point value for each baseline weight value, the DWSU 626 stores only the MSB(s) for the baseline weight value, such as X-significant bits. Accordingly, for each baseline weight value, the DWSU 626 may save 32-X bits in storage space required, meaning the DWSU 626 can be sized smaller when the DWSU 616 only stores the MSB(s) for each baseline weight value.

Furthermore, the DWSU 626 may be configured to store only the top-Y bits of each X-bit weight value. Thus, the tolerance of the quantization noise enables the ACIM circuit 624 to use weight values that are smaller than the 32-bit floating-point weight values. In one example, DWSU 626 stores baseline weight values for N model parameters, where N corresponds to the number of model parameters having weights in the baseline set, and utilizes a memory footprint equal to Y*N bits. Furthermore, if the DWSU 626 stores only the Y MSBs for each X-bit weight value for the ACIM circuit 624, further memory is saved proportional to Y/X. In some embodiments, the MSBs are stored in a short data representation format, such as a fixed point 8-bit or an integer 8-bit format.

In some embodiments, the number of quantized bits, such as MSBs, stored for all or individual weight values is predefined by a host, configurable, or established through calculation of what extent of quantized bits not stored would reduce the accuracy of the output below the threshold value. For example, any accuracy loss in the outputs generated by the ACIM circuit 624 introduced by the quantization of the weight values may be evaluated (for example, by a host or the controller 602, and so forth). If the accuracy loss for the output is unacceptable, then more quantized bits can be stored in the DWSU 626 for individual baseline weight values. In certain embodiments, the number of quantized bits stored is between 8-10 bits per weight value. This number of bits may be dependent on various factors, such as available memory, aspects of the model (such as number of layers and layer sizes), and so forth. In other embodiments, the number of quantized bits stored is less than 8-bits or more than 10-bits per weight value. In some embodiments, when storing the quantized bits(s) for the baseline weight values in the DWSU 626, the DWSU 626 may store the same number of quantized bits for each baseline weight value or store different numbers of quantized bits for different baseline weight values. For example, the calculation of what number of quantized bits not stored that would reduce the accuracy of the output of the ACIM circuit 624 below the threshold value could be applied on a layer-by-layer basis. This may identify, for individual baseline weight values of a certain layer, the least number of quantized bits to store in the DWSU 626 to maintain the accuracy at or above the threshold value.

The DWSU 626 or the controller 602 can be configured to recover appropriate weight values to apply with the ACIM circuit 624 based on the MSBs for the weight values stored in the DWSU 626. In some embodiments, the machine learning model architecture may be trained to tolerate quantized baseline weight values in the DWSU 626.

Figure 6C:
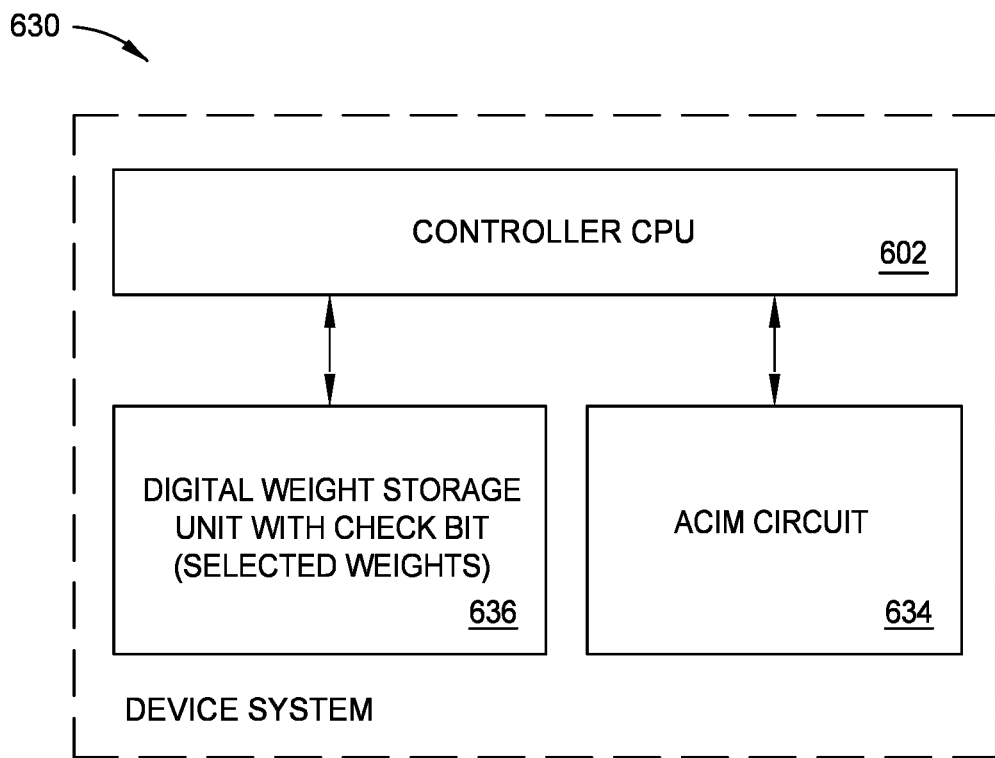

In some embodiments, the DWSU stores values for a subset of the baseline weight values. For example, FIG. 6C, depicts the device system 630 comprising an ACIM circuit 634 and a DWSU 636, where the DWSU 636 stores selected weight values, such as relatively more important weight values. For example, the DWSU 636 stores values for the subset of weights determined to be relatively more important to one or more metrics or characteristics of the model processed by the ACIM circuit 634. In one example, the relatively more important weight values may be determined based on an absolute value of the weights, such that the weights with larger absolute values are prioritized. As such, the size of DWSU 636 may be beneficially reduced by storing a selected subset of weight values corresponding to weights that have a more significant impact on model output. In some embodiments, a communication bus (not explicitly shown) couples the components of the device system 630 such that the controller 602, the ACIM circuit 634, and the DWSU 636 are able to communicate and transfer data.

In some embodiments, the host or the device system 630 may identify the importance of the baseline weight values based on one or more techniques. For example, pruning involves identifying which weight values, when removed/eliminated, cause unacceptable drops in accuracy for the output of the ACIM circuit 634. The unacceptable drop may comprise any reduction in the accuracy that causes the accuracy to fall below a threshold value. Alternatively, the unacceptable drop may comprise a reduction in the accuracy by a threshold amount or distance. The host or device system 630 may determine that the weight values that cause the unacceptable drop in the accuracy of the model are important weight values because these weight values affect the accuracy of the output. On the other hand, the weight values that do not cause unacceptable drops in the accuracy are unimportant weights.

In some embodiments, the host or device system 630 identifies important weights for storage in the DWSU 636 by applying weight nulling, another technique for identifying the importance of the weight values. Under a weight nulling methodology, relatively more important and relatively less important weight values can be identified based on identifying absolute values, or other characteristics, of the corresponding weight values. More important weights may be those weight values having high absolute values and less important weights may be those having low absolute values. For example, the host may determine that the weight values having the highest 25% of absolute values are stored in the DWSU 636 while remaining weight values are excluded or "nulled" from storage in the DWSU 636.

Additionally, the host or device system 630 may identify important weight values by identifying whether different aspects, such as layers of the machine learning model, have different effects on the accuracy of the ACIM circuit 634 (in other words, whether the ACIM circuit 634 has different sensitivities to different layers of the machine learning model). The weight values for the aspects to which the accuracy is more sensitive may be identified as relatively more important than the weight values for aspects to which the accuracy is relatively less important. For example, where certain layers of the machine learning model data processed by the ACIM circuit 634 show greater impact to the accuracy of the ACIM circuit 634 operations (i.e., are more sensitive to the corresponding weight value(s)), the host or device system 630 may identify the corresponding weight values for storage in the DWSU 636 and omit from storage weight values from layers having a lesser impact on the accuracy of the ACIM circuit 634 operations.

Additionally, the host or device system 630 may identify weights utilized by more than one model or ACIM circuit 634 as a technique for identifying weight values for storage in the DWSU 636. For example, the ACIM circuit 634 may process data for multiple models at the same time for one or more tasks. In some embodiments, such as when performing similar tasks, the different models may share one or more elements, such as convolutional layers shared between models, multi-task models, and the like. Similarly, if the DWSU 636 supports multiple ACIM circuits 634 between the same device system 630, or even different device systems 630, the DWSU 636 may store weight values that are shared among two or more models processed by the one or multiple ACIM circuits 634.

For the shared models or shared ACIM circuits 634, the weights for the shared model features, while applying to different models, have common weight values. Thus, where the ACIM circuit 634 processes two or more models that share at least one weight value, that shared weight value may be stored in the DWSU 636. In some embodiments, the host identifies only shared weights for storage in the DWSU 636, or indicates that shared weights are given priority for storage in the DWSU 636. Where the DWSU 636 includes space for additional weight values after storing the shared weights, the DWSU 636 may further store additional weight values based on the importance of the corresponding weight, as described above or using similar methods.

In some embodiments, only a subset of the weights in the ACIM circuit 634 is shared between models. For remaining weights, quantized bits, such as MSBs, or selected relatively more important weights can be stored in the DWSU 636. Alternatively, the controller 602 may null the unshared weights in the ACIM circuit 634. As such, weight values of the ACIM circuit 634 that are not shared with another ACIM circuit can be zeroed out in the ACIM circuit 634, as described in further detail below.

Thus, in some embodiments, the DWSU 636 may store one or more of relatively important weights and shared weights or any other subset of selected weights.

ACIM Circuit Degradation Detection

Returning to FIG. 6A, the controller 602, as introduced above, monitors the weight values applied by the ACIM circuit 614 and determines whether the weight values are degraded. For example, the controller 602 may employ a local buffer memory (or similar working memory) to store identified weight values applied by the ACIM circuit 614 (not shown in FIG. 6A). The controller 602 may employ various methodologies to detect degradation in the weight values applied by the ACIM circuit 614, for example, based on the identified weight values, as described below.

The controller 602 may identify the weight values being applied by the ACIM circuit 614 at a given time by applying an input signal of known values to the ACIM circuit 614. For example, the controller 602 may apply the input signal having values of "1" such that the ACIM circuit 614, when performing the multiply and accumulate operations, generates outputs that comprise the weights being applied by the ACIM circuit 614. More specifically, by multiplying the input signal value of "1" by the weight value "V" for a given memory cell of the array of memory cells forming the ACIM circuit 614, the output generated is "V", which can represent the weight value. Thus, the controller 602 is able to identify the weight value applied by the ACIM circuit 614 for that memory cell. By applying the input signal having values of 1 to all of the memory cells of the ACIM circuit 614, the controller 602 identifies all weight values being applied by the ACIM circuit 614.

According to a first methodology, the controller 602 determines whether the weight values applied by the ACIM circuit 614 are degraded based on a Hamming distance or threshold distance analysis between these weight values and the baseline weight values. Under such a methodology, the controller 602 may identify the weight values applied by the ACIM circuit 614 and compare the identified weight values to the baseline weight values. A difference between the identified weight values and the baseline weight values may be analyzed according to Hamming distance principles, Euclidean distances, or general differences. The Hamming distance is a number of positions at which two strings of equal length have different values. For example, Hamming distance between a first string 10011001 and 10011111 is 2, where two positions between the two strings have different values. Therefore, the controller 602 can determine whether a weight value is degraded by comparing the Hamming distance between the identified weight values and the baseline weight values and identifying that the Hamming distance exceeds a threshold distance. For example, when comparing the identified values and the corresponding baseline weight values, if the Hamming distance between two corresponding values is 3 and the threshold distance is 2, then the controller 602 may identify that the corresponding identified weight value is to be reset or overwritten with the baseline weight value. In some embodiments, the threshold distance is predefined, user programmable, or dynamic. In some embodiments, the Hamming or threshold distance analysis may analyze only the MSBs or other selected bits of the weights applied by the ACIM circuit 634 and the weights stored in the DWSU 636, as described with respect to FIG. 6C and the corresponding selected weight storage in the DWSU 636. In some embodiments, the threshold distance could comprise multiple threshold distances provided as parameters in firmware or similar software or instructions.

Alternatively, instead of applying a signal of "1" values to the ACIM circuit 614, the controller 602 may compare a normally generated output, such as based on applying a known input signal to the ACIM circuit 614 when performing the multiply and accumulate operations, with an expected output. If individual values of the input signal for each memory cell of the array of memory cells are known, the weight values applied by the ACIM circuit 614 can be determined from the output generated by the ACIM circuit 614 and the input signal.

In some embodiments, the controller 602 may review whether all weights applied by the ACIM circuit 614 need to be reset. For example, the controller 602 determines to reset the weight values being applied by the ACIM circuit 614 when a majority, all, or a threshold number of all the weights applied by the ACIM circuit 614 are degraded.

In some embodiments, all or a majority of weights of the ACIM circuit 614 can be reviewed to detect degradation and need for a reset, such as when the total number of weights is small or below a specific quantity that makes such a review feasible with respect to processing and time constraints. When a subset of weights is reviewed, a selection of which subset to review may be dependent on media error characteristics, such as which media elements (e.g., memory cells) are more susceptible to errors than other elements. Alternatively, a subset of weights to review can be selected based on word or bit line associations in the ACIM circuit 614. Where the subset of weights are selected at random, the number of randomly selected weight values could be tunable or selectable.

In some embodiments, the controller 602 may randomly sample a subset of the weight values to determine the need to reset all of the weight values. Under a random sampling method, the controller 602 determines to reset the weight values being applied by the ACIM circuit 614 when a majority, all, or a threshold number of the randomly sampled weights applied by the ACIM circuit 614 are degraded. For example, the controller 602 may identify, at random or based on a preset condition, selection, or otherwise, the subset of the weight values and sample the identified weight values.

Where a sufficient number of the sampled weight values are degraded, such as a majority, all, or a threshold number of the sampled weight values, the controller 602 may reset all of the weight values being applied by the ACIM circuit 614 with the baseline weight values from the DWSU 616. Where the differences between the randomly sampled weight values and the corresponding baseline weight values do not exceed the threshold amount, the controller 602 may identify the randomly sampled weight values as not degraded (or at least not sufficiently degraded to be identified as degraded).

According to another method, the controller 602 may select a subset of weight values to compare to the baseline weight values by selecting one or more bit lines or word lines of the memory cell array of the ACIM circuit 614. For example, using a process similar to wear leveling, the controller 602 can evaluate whether the weight values applied by the ACIM circuit 614 for the subset of bit lines or word lines of the memory cell array are sufficiently degraded to initiate resetting of the ACIM circuit 614 weight values.

In an additional method, the controller 602 may identify the subset of weight values to compare based on an identification of which weight values are important to a particular model metric. For example, where the one or more weight values of the model processed by the ACIM circuit 614 is important to the accuracy of the ACIM circuit (i.e., the one or more weight values are relatively more important weight values), the controller 602 identifies the weight values applied by the ACIM circuit 614 that have a threshold impact on the accuracy of the model output. Thus, the values of weights determined to be important to the model output with respect to one or more metrics are compared to the corresponding baseline weight values to determine whether the weights applied by the ACIM circuit 614 are degraded. In some embodiments, the threshold amount may be predetermined, user established, or set by firmware or similar instructions and can be use case specific. In some embodiments, the weight degradation is measured as a variation or defect in the weight values over a lifetime of the ACIM circuit 614 when not measured using the Hamming, Euclidean, or similar thresholds above.

In an alternative method, the controller 602 may select the subset of weight values to compare based on identifying absolute values of the subset of weight values. For example, the controller 602 may identify an absolute value of each weight value applied by the ACIM circuit 614 and selects weight values to compare accordingly. For example, the controller 602 identifies a subset of the weight values with the top 10 or largest 10% of absolute values or the like. Thus, the weights having the top 10 or largest 10% of absolute values are compared to the corresponding baseline weight values to determine whether the weights applied by the ACIM circuit 614 are degraded.

In some embodiments, the controller 602 monitors the weight values applied by the ACIM circuit 614 according to one of the methods introduced above, or any other method, periodically. For example, the controller 602 monitors the weight values applied by the ACIM circuit 614 based on a running timer that cycles periodically (e.g., based on time, processing cycles, power cycles, and the like). Alternatively, or additionally, the controller 602 may limit monitoring the weight values applied by the ACIM circuit 614 to when the controller 602 and/or the device system 610 is idle. In some embodiments, the controller 602 determines that the weight values applied by the ACIM circuit 614 is degraded based on monitoring an idle period of the CIM module with respect to an idle period threshold value.

Alternatively, as opposed to determining that the ACIM circuit 614 weight values are degraded, the controller 602 may reset the weight values periodically without determining degradation. For example, the controller 602 may overwrite the weight values in the ACIM circuit 614 at the expiration of a timer, after a counter reaches a certain number (e.g., a cycle count), or after a period passed since a previous reset or initiation with the corresponding baseline weights. Where the controller 602 resets the weights periodically, the period may be defined according to a storage media of the device system 610 and/or the ACIM circuit 614, and so forth. In some embodiments, the controller 602 may establish the period for reset based on tracking of previous periods between resets when the controller 602 previously determined whether the weight values were degraded according to a methodology described above.

Thus, unlike the device system 520 of FIG. 5, the device system 610 comprises the controller 602 and the DWSU 616 locally with respect to the ACIM circuit 614 and may perform the aforementioned operations locally instead of relying on an external host system. By using the controller 602 locally at the device system 610 to determine whether the weight values applied by the ACIM circuit 614 are degraded, resources are preserved. For example, movement of the weight values from the ACIM circuit 614 to an external host, which requires time and energy, is not required for maintenance of the weight values.

Error Correction

In some embodiments, each of the DWSU 616 and the ACIM circuit 614 experience conditions that cause errors in the stored values.

As introduced above, the DWSU 616 may include ECC or similar error correction components to identify and correct errors in the weight values stored in the DWSU 616. In some embodiments, the ACIM circuit 614 comprises its own error correction components local to the ACIM circuit 614 that enable the ACIM circuit 614 to identify errors in the analog memory cells, such as degradation of the weight values applied to input signals.

Figure 6D:
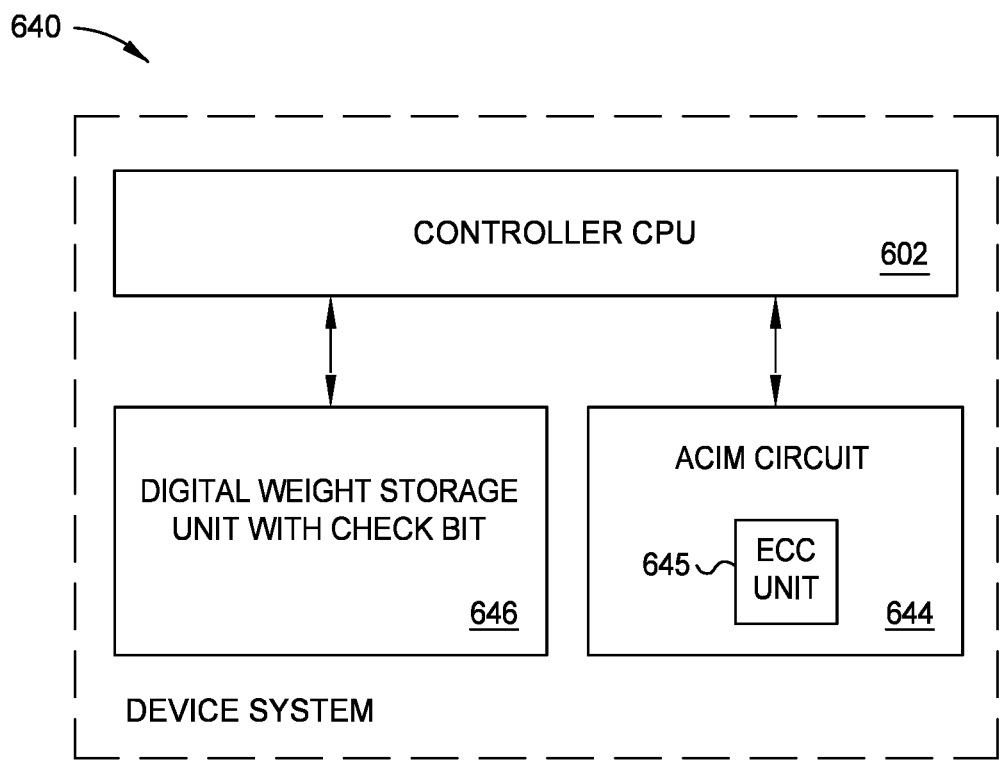

For example, FIG. 6D depicts the device system 640 comprising an ACIM circuit 644 corresponding to the ACIM circuit 614 of FIG. 6A, where the ACIM circuit 644 includes an error correction component 645, and a DWSU 646 corresponding to the DWSU 616, where the DWSU 646 comprises a check bit instead of the ECC of the DWSU 616. In some embodiments, a communication bus (not explicitly shown) couples the components of the device system 640 such that the controller 602, the ACIM circuit 644, and the DWSU 646 are able to communicate and transfer data.

In some embodiments, the error correction component 645 includes error correction codes, such as data-aware arithmetic error coding schemes, or AN-codes. The ACIM circuit 644, or the controller 602, may use the error correction component 645 to correct errors or degradation in the weight values applied by the ACIM circuit 644, similar to how corresponding error correction components correct issues in storage devices. In some embodiments, the error correction steps taken or performed by the error correction components 645 may reduce an effect of accuracy degradation caused by array noise but be limited in error correction capabilities due to the power and latency demands of ECC. By employing the error correction component 645, the ACIM circuit 644 may delay a need to reset the weight values applied by the ACIM circuit 644 by the baseline weight values as compared to when the ACIM circuit 614 may be reset with its values of the baseline set. Thus, the device system 640 may expend less time and resources resetting the weight values as compared to the device system 610 and the ACIM circuit 614. Other than the operations of the error correction component 645, the ACIM circuit 644 corresponds to the ACIM circuit 614.

In some embodiments, the check bit components of the DWSU 646 leverage weight nulling to cure errors in the DWSU 646. For example, the check bit components of the DWSU 646 may employ a scheme that stores each weight value with a corresponding check bit set to "1". Where the check bit for any weight value is set or changed to "0", the DWSU 646 may set that corresponding weight value to zero, nulling that weight in the DWSU 646. In some embodiments, the nulling of a weight in the DWSU 646 causes the controller 602 to reset the corresponding analog weight value in the ACIM circuit 644. The reset of the corresponding analog weight value in the ACIM circuit 644 may occur at a predetermined period, at the next reset of the analog weight values in the ACIM circuit 644, or immediately on detection of the error in the DWSU 646 nulling the weight value in the DWSU 646 to zero. Should the errors in the DWSU 646 exceed a threshold, an external host can reset the baseline weight values stored in the DWSU 646.

Figure 7:
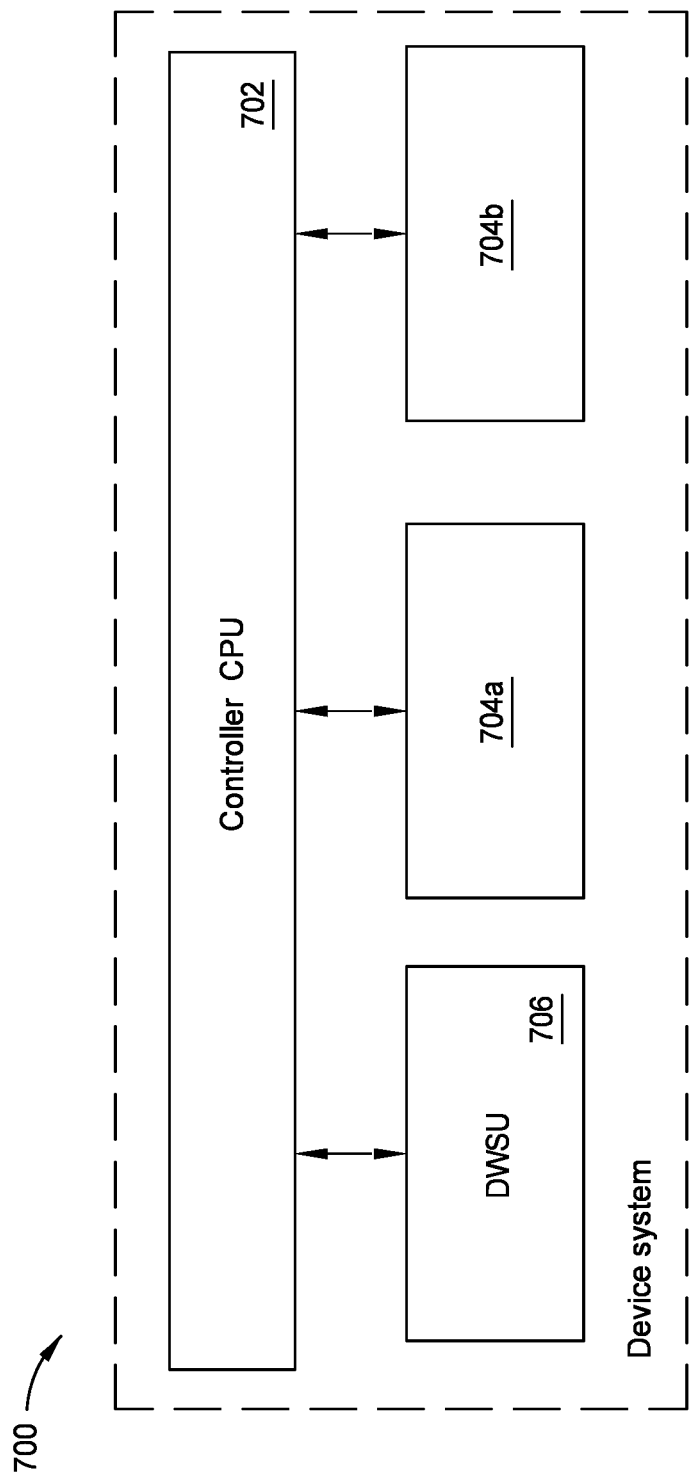
FIG. 7 depicts a block diagram of a device system employing a plurality of memory arrays, according to an exemplary embodiment.

FIG. 7 depicts a block diagram of a device system 700 employing a plurality of memory arrays, according to an exemplary embodiment. The device system 700 comprises a controller 702 corresponding to the controller 602 of FIGS. 6A-6D and a DWSU 706 corresponding to one of the DWSUs 616, 626, 646, or 626 of FIGS. 6A-6D, respectively. Additionally, the device system 700 comprises two ACIM circuits 704a and 704b. In some embodiments, a communication bus (not explicitly shown) couples the components of the device system 700 such that the controller 702, the ACIM circuits 704a and 704b, and the DWSU 706 are able to communicate and transfer data.

In operation, the ACIM circuits 704a and 704b may be described with respect to the ACIM circuit 614, 624, 644, or 624 of FIG. 6A-6D, respectively, or the like. The ACIM circuits 704a and 704b may operate one at a time. For example, while the ACIM circuit 704a is active and providing outputs based on applying weights to input signals, the ACIM circuit 704b is disabled and sitting idle in the background. During this idle time, the controller 702 may determine whether the weight values of the ACIM circuit 704b need to be reset, may perform any maintenance or the like on the ACIM circuit 704b, and so forth.

The device system 700 may toggle between the ACIM circuits 704a and 704b over time. For example, while one of the ACIM circuits 704a and 704b is operational as a primary ACIM, the other may be idle in the background acting as a back-up or secondary ACIM that can be "hot swapped" with the primary in case the performance of the primary ACIM degrades.

In some embodiments, the ACIM circuits 704a and 704b may comprise error correction components (not shown) that indicate or are used to identify an error, for example, via the controller 702, in the respective ACIM circuit 704a and 704b, similar to the error correction components of the ACIM circuit 624 of FIG. 6B. For example, where the error correction components indicate or are used to identify an error in the ACIM circuit 704a, the controller 702 detects an error in the operational ACIM circuit 704a. The ACIM circuit 704a can continue to operate as long as its output is within an acceptable threshold.

While the ACIM circuit 704a is operational and the ACIM circuit 704b is idle, the controller 702 may trigger a reset of the weights in the background ACIM circuit 704b to the baseline weight values. Thus, the controller 702 can correct any errors identified in the background ACIM circuit 704b (for example, when the ACIM circuit 704b was operational) and correct any time-based degradation experienced by the background ACIM circuit 704b accumulated during operation or when nonoperational. Thus, the weight and corresponding values of the background ACIM circuit 704b, and any other inactive memory arrays can be reset, as needed, while nonoperational in the background. By performing the reset while the corresponding memory rays and accelerators are nonoperational in the background, the reset may reduce performance overhead that results from taking the operational ACIM circuit 704a offline to reset the weight values, because programming the active ACIM circuit 704a introduces latencies and, thus, expends resources.

When the errors in the operational ACIM circuit 704a cause the output accuracy to fall below the threshold, the controller 702 may transition operation from the ACIM circuit 704a to the ACIM circuit 704b. In some embodiments, the controller 702 may employ various logical factors to determine when or whether to switch between ACIM circuits 704a and 704b.

For example, the switch between the ACIM circuits 704a and 704b may occur at an established period, based on a number of operations experienced or performed by the operational ACIM circuit 704a, and so forth. Because the ACIM circuit 704b was reset to the baseline weight values, the operation of the digital system 700 can continue with reduced downtime as compared to, for example, the digital system 610 having only a single ACIM circuit 614. This is because when the ACIM circuit 614 weight values are reset, the digital system 610 is effectively nonoperational for that entire duration, whereas the device system 700 can reset ACIM circuits 704b in the background while another ACIM circuit 704a is operational.

In some embodiments, the transition between the ACIM circuit 704a and 704b occurs after a short period of the ACIM circuit 704b being nonoperational because the ACIM circuit 704 experiences many read operations in a short time. As such, the controller 702 may switch between the ACIM circuit 704a to the ACIM circuit 704b without expressly resetting the weight values in the ACIM circuit 704b because the ACIM circuit 704b would have experienced minimal degradation in the short period it was inactive while the ACIM circuit 704a was active and experiencing many read operations.

In some embodiments, the controller 702 (or any other controller operating in the background locally or remotely from the ACIM circuit 704b) may analyze the ACIM circuit 704b while in the background to determine a need to reset the corresponding weight values of the ACIM circuit 704b. For example, the controller 702 may apply any of the error detection or degradation detection methodologies introduced above.

In some embodiments, such operational and background transitioning can be applied at a finer-grain than just the ACIM circuits 704a and 704b. For example, wherein the ACIM circuits 704a and 704b are organized as cell or bit banks or arrays (referred to interchangeably herein) of memory cells, then individual banks can be pre-programmed, reprogrammed, or remapped with correct weight values independently from other banks. This can reduce both programming latency and memory utilization for remapping by remapping different banks based on individualized conditions or at different times.

Note that while ACIM circuit 704a is shown separated from the ACIM circuit 704b, this may be a logical and not physical separation in some embodiments. For example, ACIM circuits 704a and 704b may be subsets of a larger, common memory circuit.

Example Method of Performing CIM Computations

Figure 8:
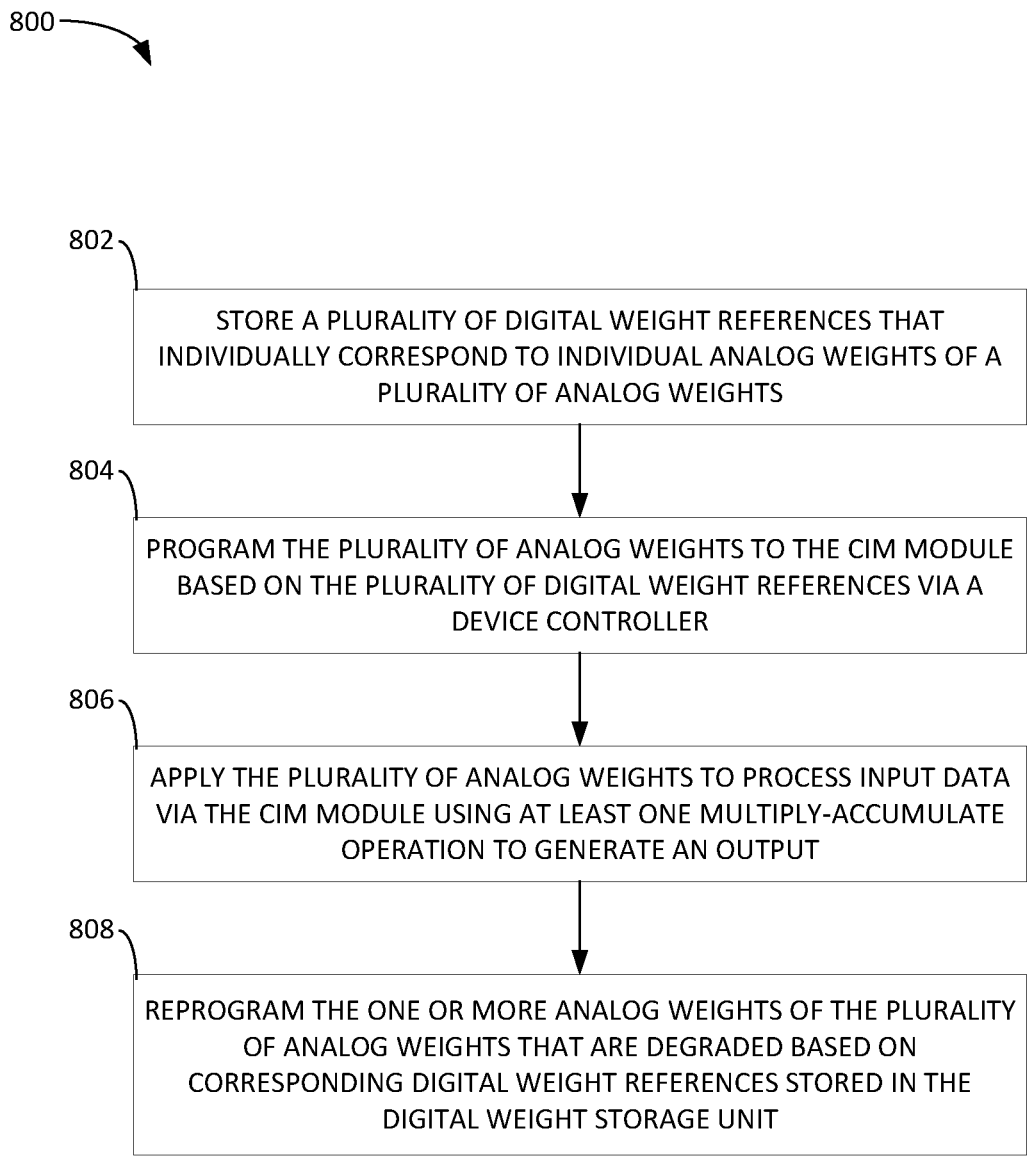
FIG. 8 depicts an example method of performing CIM computations, as described herein.

FIG. 8 depicts an example method 800 of performing CIM computations, as described herein. For example, the controller 602 and/or the controller 702 of FIGS. 6A-6D and/or FIG. 7, respectively, may be configured to perform one or more steps of the method 800.

Method 800 starts at block 802 with storing a plurality of digital weight references. In some embodiments, the digital weight references are stored in a digital weight storage unit, such as the DWSU 616, 626, 646, or 626 of FIGS. 6A-6D, respectively. An individual digital weight reference of the plurality of digital weight references may correspond to an analog weight of a plurality of analog weights applied by an analog compute in memory (CIM) module, such as the ACIM accelerator 614, 624, 634, and 644 introduced and described above with respect to FIGS. 6A-6D, respectively. In some embodiments, the digital weight references stored in the digital weight storage unit are converted to analog for storage in the CIM module. In some embodiments, the digital weight storage unit may store weight references for all weights stored in the CIM module or a subset of weight references of the weights stored in the CIM module. In some embodiments, the digital weight storage unit may store quantized bits for weight references for all or a subset of the weights stored in the CIM module.

The method 800 then proceeds to block 804 with programming the plurality of analog weights to the CIM module based on the plurality of digital weight references via a device controller. In some embodiments, the device controller corresponds to the controller 602 of FIGS. 6A-6D and the controller 702 of FIG. 7. In some embodiments, as introduced above, programming the plurality of analog weights to the CIM module comprises converting the digital weight references in the digital weight storage unit to analog values for storage in the CIM module.

The method 800 then proceeds to block 806 with applying the plurality of analog weights to process input data using at least one multiply-accumulate operation to generate an output. In some embodiments, the block 806 of the method 800 is performed via the CIM module. In some embodiments, the analog weights may correspond to digital values, such as ML model values of weights or other operands that are converted to analog values via a DAC, described above. In some embodiments, processing the input data may comprise applying input voltage signals to word lines of the CIM module to generate output current signals based on resistance or conductance value representative of the analog weights, for example, according to the MAC operations described above.

The method 800 then proceeds to block 808 with reprogramming the one or more analog weights of the plurality of analog weights in the CIM module that are degraded based on corresponding digital weight references (for example, the baseline weight values introduced above) stored in the digital weight storage unit. In some embodiments, reprogramming the one or more analog weights comprises resetting or overwriting the one or more analog weights with the corresponding baseline weight values.

Notably, FIG. 8 is just one example method, and other methods having additional, different, and/or fewer steps (or blocks) are possible consistent with the various embodiments described herein.

Example Method of Performing Degradation Detection in the CIM

Figure 9:
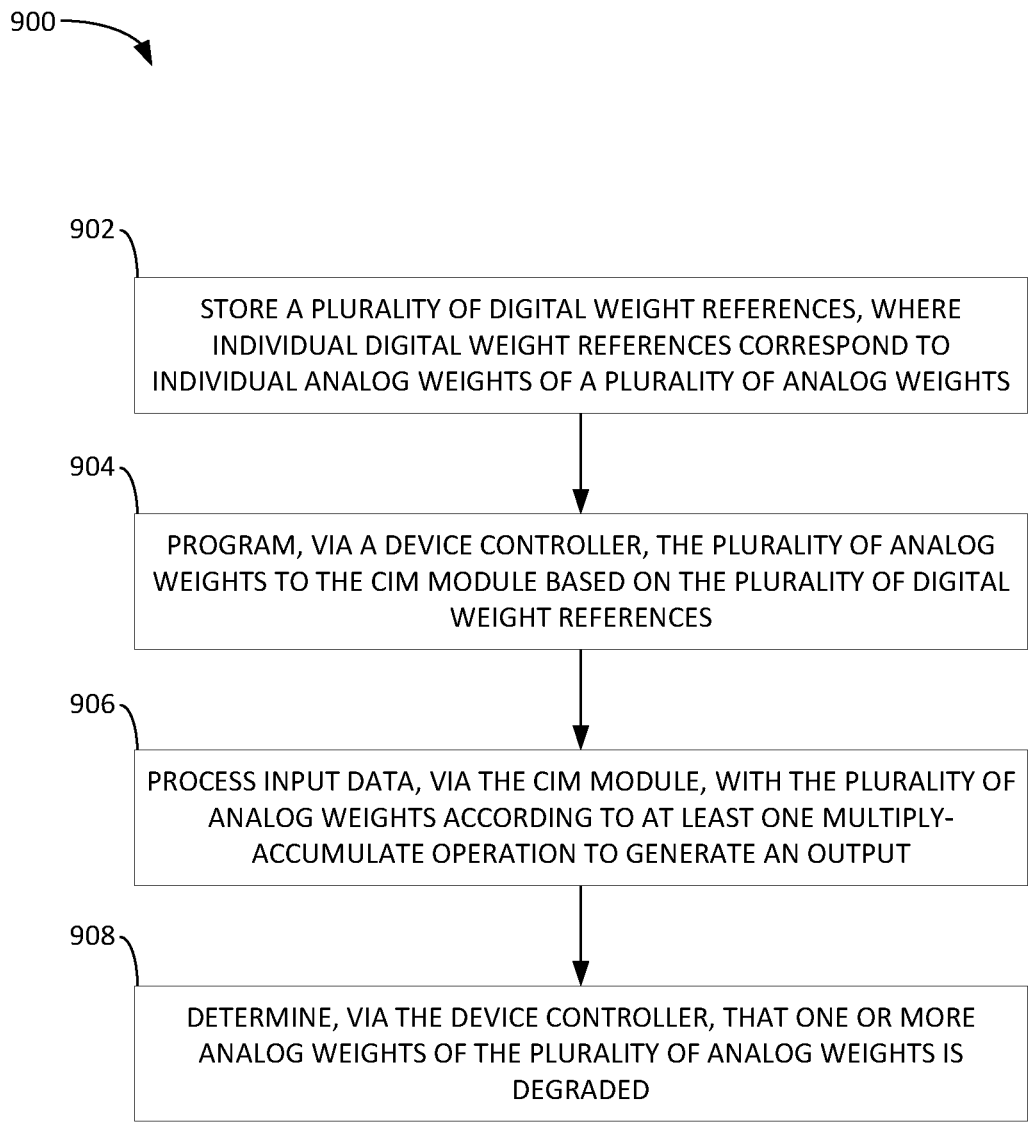
FIG. 9 depicts an example method of detecting weight degradation in a CIM module, as described herein.

FIG. 9 depicts an example method 900 of detecting weight degradation in a CIM module, as described herein. For example, the controller 602 and/or the controller 702 of FIGS. 6A-6D and/or FIG. 7, respectively, may be configured to perform one or more steps of the method 900. The method 900 includes some operations that are similar to the operations shown in the method 800 of FIG. 8. Corresponding steps between the methods 900 and 800 have corresponding functionality and operations, and so forth. Thus, for blocks in the method 900 that correspond to blocks in the method 800, corresponding description will not be duplicated for brevity.

Method 900 starts at block 902 with storing a plurality of digital weight references, which is similar to the block 802 of the method 800.

The method 900 then proceeds to block 904 with programming the plurality of analog weights to the CIM module based on the plurality of digital weight references via a device controller, similar to block 804 of the method 800.

The method 900 then proceeds to block 906 with processing input data with the plurality of analog weights using at least one multiply-accumulate operation to generate an output, similar to block 806 of the method 800.

The method 900 then proceeds to block 908 with determining that one or more analog weights of the plurality of analog weights is degraded. In some embodiments, the determining of degradation of one or more analog weights is performed by the device controller using one or more of the degradation detection methodologies described above.

Notably, FIG. 9 is just one example method, and other methods having additional, different, and/or fewer steps (or blocks) are possible consistent with the various embodiments described herein.

Example Processing System

Figure 10:
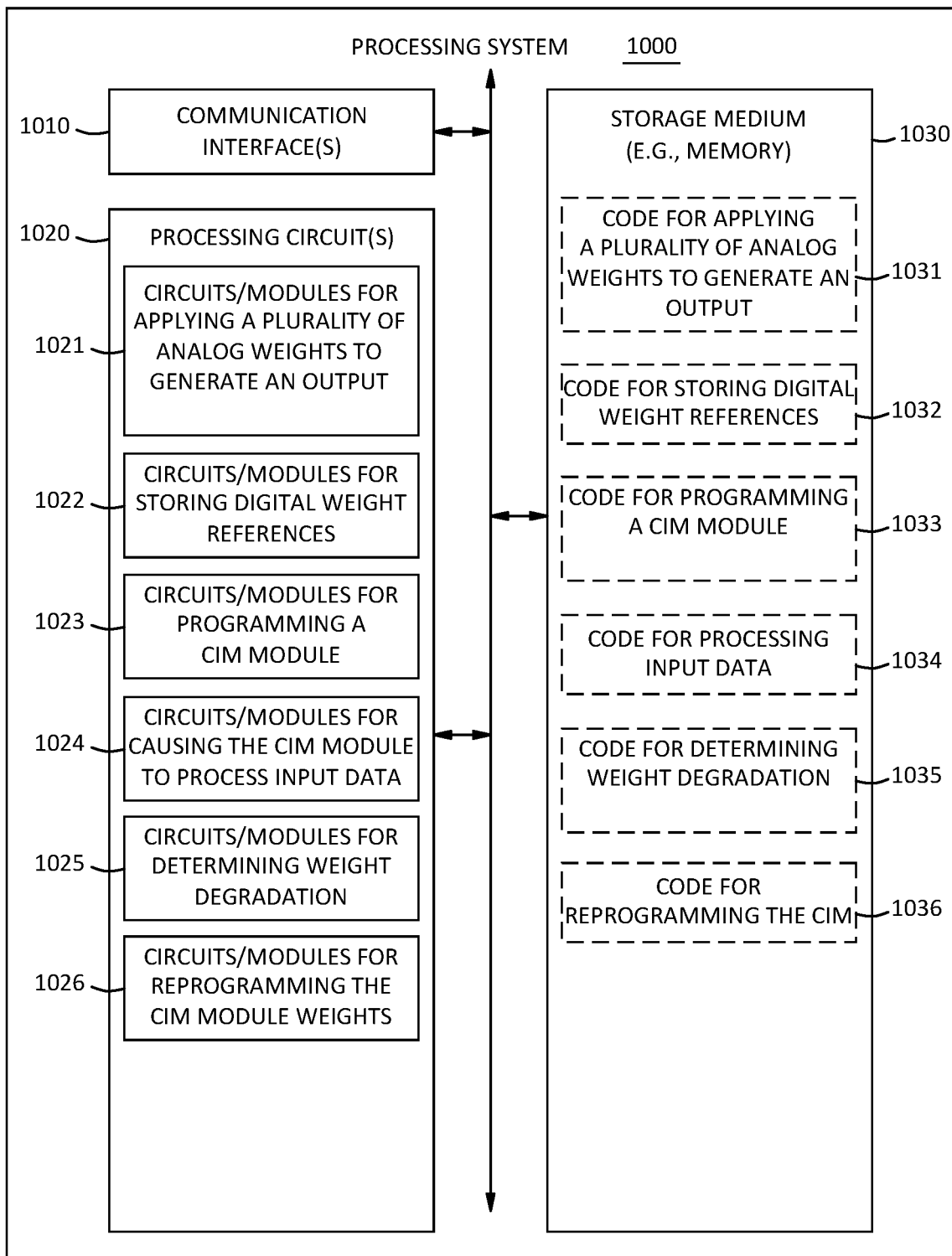
FIG. 10 depicts an example processing system, in accordance with some embodiments of the present disclosure.

FIG. 10 depicts an example processing system 1000, which may be configured to perform the various aspects described herein, including the methods described with respect to FIGS. 8 and 9 and/or corresponding to the device systems of FIGS. 6A-7.

Processing system 1000, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 1000 includes a communication interface(s) 1010, processing circuit(s) 1020 (e.g., at least one processor and/or other suitable circuitry), and storage medium 1030 (e.g., a non-volatile memory). These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit(s) 1020 and the overall design constraints. The signaling bus links together various elements such that each of the communication interface 1010, the processing circuit(s) 1020, and the storage medium 1030 are coupled to and/or in electrical communication with each other. The signaling bus may also link various other circuits (not shown) such as timing sources, peripherals, voltage regulators, and power management circuits, which are well known in the art, and therefore, will not be described any further.

The communication interface 1010 provides a means for communicating with other devices or apparatuses over a transmission medium. In some implementations, the communication interface 1010 includes circuitry and/or programming (e.g., a program) adapted to facilitate the communication of information bi-directionally with respect to one or more devices in a system. In some implementations, the communication interface 1010 may be configured for wire-based communication. For example, the communication interface 1010 could be a bus interface, a send/receive interface, or some other type of signal interface including drivers, buffers, or other circuitry for outputting and/or obtaining signals (e.g., outputting signal from and/or receiving signals into an integrated circuit). The communication interface 1010 serves as one example of a means for receiving and/or a means for transmitting.

The storage medium 1030 may represent one or more computer-readable, machine-readable, and/or processor-readable devices for storing programming, such as processor executable code or instructions (e.g., software, firmware), electronic data, databases, or other digital information. The storage medium 1030 may also be used for storing data that is manipulated by the processing circuit(s) 1020 when executing programming. The storage medium 1030 may be any available media that can be accessed by a general purpose or special purpose processor, including portable or fixed storage devices, optical storage devices, and various other mediums capable of storing, containing or carrying programming.

By way of example and not limitation, the storage medium 1030 may include a magnetic storage device (e.g., hard disk, floppy disk, magnetic tape/strip), an optical disk (e.g., a compact disc (CD) or a digital versatile disc (DVD)), a smart card, a flash memory device (e.g., an SSD, a card, a stick, or a key drive), a RAM, ROM, PROM, EPROM, an EEPROM, MRAM, PCM, ReRAM, a register, a removable disk, and any other suitable medium for storing software and/or instructions that may be accessed and read by a computer. The storage medium 1030 may be embodied in an article of manufacture (e.g., a computer program product). By way of example, a computer program product may include a computer-readable medium in packaging materials. In view of the above, in some implementations, the storage medium 1030 may be a non-transitory (e.g., tangible) storage medium. For example, the storage medium 1030 may be a non-transitory computer-readable medium storing computer-executable code, including code to perform operations as described herein.

The storage medium 1030 may be coupled to the processing circuit(s) 1020 so that the processing circuit 1020 can read information from, and write information to, the storage medium 1030. That is, the storage medium 1030 can be coupled to the processing circuit(s) 1020 so that the storage medium 1030 is at least accessible by the processing circuit(s) 1020, including examples where at least one storage medium is integral to the processing circuit(s) 1020 and/or examples where at least one storage medium is separate from the processing circuit(s) 1020 (e.g., resident in the system 1000, external to the system 1000, distributed across multiple entities, etc.).

Programming stored by the storage medium 1030, when executed by the processing circuit(s) 1020, causes the processing circuit(s) 1020 to perform one or more of the various functions and/or process operations described herein. For example, the storage medium 1030 may include operations configured for regulating operations at one or more hardware blocks of the processing circuit(s) 1020, as well as to utilize the communication interface(s) 1010 for wireless communication utilizing their respective communication protocols.

At least some of the processing circuits described herein are generally adapted for processing, including the execution of such programming stored on a storage medium such as storage medium 1030. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 1020 may be adapted to perform any or all of the features, processes, functions, operations and/or routines for any or all of the controller apparatuses described herein. For example, the processing circuit(s) 1020 may be configured to perform any of the steps, functions, and/or processes described with respect to FIGS. 8 and 9 and/or corresponding to the device systems of FIGS. 6A-7. As used herein, the term "adapted" in relation to the processing circuit(s) 1020 may refer to the processing circuit(s) 1020 being one or more of configured, employed, implemented, and/or programmed to perform a particular process, function, operation and/or routine according to various features described herein. The processing circuit(s) 1020 may be a specialized processor, such as an ASIC that serves as a means for (e.g., structure for) carrying out any one of the operations described in conjunction with FIGS. 8 and 9, and corresponding to the device systems of FIGS. 6A-7. The processing circuit(s) 1020 serves as one example of a means for processing. In various implementations, the processing circuit(s) 1020 may provide and/or incorporate, at least in part, the functionality described above for the methods of FIGS. 8 and 9 and the device systems of FIGS. 6A-7.

According to at least one example of the system 1000, the processing circuit(s) 1020 may include one or more of: a circuit/module 1021 for determining a probability of an unreliable base classifier; a circuit/module 1022 for applying a plurality of analog weights to generate an output; a circuit/module 1023 for storing digital weight references; a circuit/module 1024 for causing the CIM module to process input data; a circuit/module 1025 for determining weight degradation; and a circuit/module 1026 for reprogramming the CIM module weights. Notably, these are just some examples, and others are possible based on the various aspects described herein.

As mentioned above, a program stored by the storage medium 1030, when executed by the processing circuit(s) 1020, causes the processing circuit(s) 1020 to perform one or more of the various functions and/or process operations described herein. For example, the program may cause the processing circuit(s) 1020 to perform and/or control the various functions, steps, and/or processes described herein with respect to FIGS. 8 and 9 and corresponding to the device systems of FIGS. 6A-7.

As shown in FIG. 10, the storage medium 1030 may include one or more of: code 1031 for applying a plurality of analog weights to generate an output; code 1032 for storing digital weight references; code 1033 for programming a CIM module; code 1034 for processing input data; code 1035 for determining weight degradation; and code 1036 for reprogramming the CIM module. Notably, these are just some examples, and others are possible based on the various aspects described herein.

In at least some examples, the various circuits/modules in 1020 as well as other processing elements described herein may comprise means for performing the various functions described herein, including the functions enabled by the various codes stored in storage medium 1030.

Example Clauses

Implementation examples are described in the following numbered clauses:

Clause 1: A device for performing compute in memory (CIM) computations, the device comprising: a compute in memory (CIM) module configured to apply a plurality of analog weights to input data using at least one multiply-accumulate operation to generate an output; a digital weight storage unit configured to store a plurality of digital weight references, wherein a digital weight reference of the plurality of digital weight references corresponds to an analog weight of the plurality of analog weights; and a device controller configured to: program the plurality of analog weights to the CIM module based on the plurality of digital weight references; cause the CIM module to process the input data; and reprogram one or more analog weights of the plurality of analog weights that are degraded based on corresponding digital weight references stored in the digital weight storage unit, wherein: the plurality of digital weight references in the digital weight storage unit are populated with values from a host processing device, and degraded analog weights in the CIM module are reprogrammed based on the corresponding digital weight references from the digital weight storage unit without reference to the host processing device.

Clause 2: The device of clause 1, wherein the digital weight storage unit is further configured to store no more than a configured number of most significant bits (MSBs) of one or more of the plurality of digital weight references, the configured number being smaller than the total number of bits.

Clause 3: The device of any one of clauses 1 and 2, wherein the digital weight storage unit is further configured to store digital weight references for a selected subset of the plurality of analog weights.

Clause 4: The device of clause 3, wherein the selected subset of the plurality of analog weights is predetermined by a host processing device in data communication with the device.

Clause 5: The device of any one of clauses 3 and 4, wherein the selected subset of the plurality of analog weights is selected based on a characteristic of each analog weight of the plurality of analog weights.

Clause 6: The device of clause 5, wherein the characteristic comprises an absolute value of each analog weight of the plurality of analog weights.

Clause 7: The device of any one of clauses 5 and 6, wherein the characteristic comprises a layer of a machine learning model associated with each analog weight of the plurality of analog weights.

Clause 8: The device of any one of clauses 3-7, wherein the selected subset of the plurality of analog weights is selected based on a determination that each selected analog weight in the selected subset of the plurality of analog weights exceeds a threshold impact on an accuracy of the output.

Clause 9: The device of any one of clauses 3-8, wherein the selected subset of the plurality of analog weights is randomly sampled from the plurality of analog weights.

Clause 10: The device of any one of clauses 3-9, wherein the selected subset of the plurality of analog weights is selected based on an association with one or more particular bit lines or word lines in the CIM module.

Clause 11: The device of clause 10, wherein the one or more particular bit lines or word lines in the CIM module is identified based on the output having a higher sensitivity to the one or more particular bit lines or word lines than other bit lines or word lines.

Clause 12: The device of any one of clauses 3-11, wherein one or more analog weights of the selected subset of the plurality of analog weights is selected based on being used in one or more shared layers of a multi-task machine learning model.

Clause 13: The device of any one of clauses 3-12, wherein one or more analog weights of the selected subset of the plurality of analog weights is selected based on being used in one or more shared layers of a multi-task machine learning model.

Clause 14: The device of any one of clauses 1-13, wherein the digital weight storage unit is further configured to store a digital weight reference for each of the plurality of analog weights.

Clause 15: The device of any one of clauses 1-14, wherein the digital weight storage unit comprises an error correction component configured to detect and correct an error in the digital weight references stored in the digital weight storage unit.

Clause 16: The device of clause 15, wherein the error correction component is further configured to detect the error in the digital weight storage unit based on detection of a check bit changing state for a corresponding digital weight reference and correct the error based on nulling the corresponding digital weight reference.

Clause 17: The device of any one of clauses 1-16, wherein the device comprises one of a Storage Class Memory device, a USB drive, and a memory module.

Clause 18: A method for performing compute in memory (CIM) computations, comprising: storing, via a digital weight storage unit, a plurality of digital weight references, wherein a digital weight reference of the plurality of digital weight references corresponds to an analog weight of a plurality of analog weights applied by a CIM module; programming the plurality of analog weights to the CIM module based on the plurality of digital weight references via a device controller; applying the plurality of analog weights to process input data via the CIM module using at least one multiply-accumulate operation to generate an output; and reprogramming one or more analog weights of the plurality of analog weights that are degraded based on corresponding digital weight references stored in the digital weight storage unit, wherein: the plurality of digital weight references in the digital weight storage unit are populated with values from a host processing device, and degraded analog weights in the CIM module are reprogrammed based on the corresponding digital weight references from the digital weight storage unit without reference to the host processing device.

Clause 19: The method of clause 18, wherein storing the plurality of digital weight references comprises storing the digital weight references corresponding to a selected subset of the plurality of analog weights.

Clause 20: A system for performing compute in memory (CIM) computations, comprising: means for applying a plurality of analog weights to input data using at least one multiply-accumulate operation to generate an output; means for storing a plurality of digital weight references, wherein a digital weight reference of the plurality of digital weight references corresponds to an analog weight of the plurality of analog weights applied by the means for applying; means for programming the plurality of analog weights to the means for applying based on the plurality of digital weight references; and means for reprogramming one or more analog weights of the plurality of analog weights that are degraded based on corresponding digital weight references stored in the means for storing.

Clause 21: A device for performing compute in memory (CIM) computations, the device comprising: a compute in memory (CIM) module configured to apply a plurality of analog weights to input data using at least one multiply-accumulate operation to generate an output; a digital weight storage unit configured to store a plurality of digital weight references, wherein a digital weight reference of the plurality of digital weight references corresponds to an analog weight of the plurality of analog weights; and a device controller configured to: program the plurality of analog weights to the CIM module based on the plurality of digital weight references; and determine that one or more analog weights of the plurality of analog weights is degraded, wherein: the plurality of digital weight references in the digital weight storage unit is populated with values from a host device, and degraded analog weights in the CIM module are replaced with corresponding digital weight references from the digital weight storage unit without reference to the host device.

Clause 22: The device of clause 21, wherein: the CIM module comprises a first array of bit cells and a second array of bit cells, each configured to be individually programmed with the plurality of analog weights; and the device controller is further configured to program the plurality of analog weights to one of the first or second array of bit cells while causing the other of the first or second array of bit cells to generate the output.

Clause 23: The device of any one of clauses 21 and 22, wherein in order to determine that one or more analog weights of the plurality of analog weights is degraded, the device controller is further configured to determine that a threshold amount of time has passed since the analog weights were programmed to the CIM module.

Clause 24: The device of clause 23, wherein the threshold amount of time is determined based on one or more parameters of the CIM module.

Clause 25: The device of any one of clauses 21-24, wherein in order to determine that one or more analog weights of the plurality of analog weights is degraded, the device controller is further configured to determine that the output falls below an output threshold.

Clause 26: The device of any one of clauses 21-25, wherein: the CIM module comprises an error correction component configured to monitor and correct errors in the plurality of analog weights programmed to the CIM module, the device controller is further configured to reprogram the one or more analog weights of the plurality of analog weights that are degraded based on corresponding digital weight references stored in the digital weight storage unit, and the plurality of analog weights is reprogrammed based on corresponding digital weight references stored in the digital weight storage unit when a threshold amount of time has passed since the analog weights were written to the CIM module.

Clause 27: The device of any one of clauses 21-26, wherein the device controller is further configured to determine that one or more analog weights of the plurality of analog weights is degraded based on a wear leveling mechanism applied to the CIM.

Clause 28: The device of clause 27, wherein the device controller is further configured to apply the wear leveling mechanism to the CIM, the wear leveling mechanism configured to: read values corresponding to a selection of bit lines or word lines in the CIM module, and determine that the plurality of analog weights are degraded based on the read values of the selection of bit lines or word lines in the CIM.

Clause 29: The device of any one of clauses 21-28, wherein in order to determine that one or more analog weights of the plurality of analog weights is degraded, the device controller is further configured to: read values corresponding to the programmed plurality of analog weights from the CIM; convert the read values to digital values; and determine that at least one digital value differs from a corresponding digital weight reference stored in the digital weight storage unit by more than a threshold difference value.

Clause 30: The device of clause 29, wherein the threshold difference value comprises a Hamming distance.

Clause 31: The device of any one of clauses 21-30, wherein in order to determine that one or more analog weights of the plurality of analog weights is degraded, the device controller is further configured to determine an idle period of the CIM module exceeds an idle period threshold value.

Clause 32: A method comprising: storing a plurality of digital weight references in a digital weight storage unit, wherein a digital weight reference of the plurality of digital weight references corresponds to an analog weight of a plurality of analog weights applied by a compute in memory (CIM) module; programming, via a device controller, the plurality of analog weights to the CIM module based on the plurality of digital weight references; processing input data, via the CIM module, with the plurality of analog weights according to at least one multiply-accumulate operation to generate an output; and determining, via the device controller, that one or more analog weights of the plurality of analog weights is degraded, wherein: the plurality of digital weight references in the digital weight storage unit is populated with values from a host device, and degraded analog weights in the CIM module are replaced with corresponding digital weight references from the digital weight storage unit without reference to the host device.

Clause 33: The method of clause 32, wherein: the CIM module comprises a first array of bit cells and a second array of bit cells, each configured to be individually programmed with the plurality of analog weights; and programming the plurality of analog weights to the CIM module comprises programming the plurality of analog weights to the first array of bit cells while causing the array of bit cells to generate the output.

Clause 34: The method of any one of clauses 32 and 33, wherein determining that one or more analog weights of the plurality of analog weights is degraded comprises determining that a threshold amount of time has passed since the plurality of analog weights were programmed to the CIM module.

Clause 35: The method of any one of clauses 32-34, wherein determining that one or more analog weights of the plurality of analog weights is degraded comprises determining that the output falls below an output threshold.

Clause 36: The method of any one of clauses 32-35, further comprising: monitoring and correcting errors in the plurality of analog weights programmed to the CIM module via an error correction component; and reprogramming the one or more analog weights of the plurality of analog weights that are degraded based on corresponding digital weight references stored in the digital weight storage unit when a threshold amount of time has passed since the analog weights were programmed to the CIM module.

Clause 37: The method of any one of clauses 32-36, wherein determining that one or more analog weights of the plurality of analog weights is degraded comprises monitoring values corresponding to a selection of bit lines or word lines in the CIM module via a wear leveling mechanism applied to the CIM.

Clause 38: The method of any one of clauses 32-37, wherein determining that one or more analog weights of the plurality of analog weights is degraded comprises: reading values corresponding to the programmed plurality of analog weights from the CIM; converting the read values to digital values; and determining that at least one digital value differs from a corresponding digital weight reference stored in the digital weight storage unit by more than a threshold difference value.

Clause 39: The method of any one of clauses 32-38, wherein determining that one or more analog weights of the plurality of analog weights is degraded comprises determining that an idle period of the CIM module exceeds an idle period threshold value.

Clause 40: A device for performing compute in memory (CIM) computations, the device comprising: means for processing input data with a plurality of analog weights according to at least one multiply-accumulate operation to generate an output; means for storing a plurality of digital weight references, wherein a digital weight reference of the plurality of digital weight references corresponds to an analog weight of the plurality of analog weights applied by the means for processing; means for programming the plurality of analog weights to the means for processing based on the plurality of digital weight references; and means for determining that one or more analog weights of the plurality of analog weights is degraded.

Clause 41: A processing system, comprising: a memory comprising computer-executable instructions; one or more processors configured to execute the computer-executable instructions and cause the processing system to perform a method in accordance with any one of clauses 1-40.

Clause 42: A processing system, comprising means for performing a method in accordance with any one of clauses 1-40.

Clause 43: A non-transitory computer-readable medium comprising computer-executable instructions that, when executed by one or more processors of a processing system, cause the processing system to perform a method in accordance with any one of clauses 1-40.

Clause 44: A computer program product embodied on a computer-readable storage medium comprising code for performing a method in accordance with any one of clauses 1-40.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A device for performing compute in memory (CIM) computations, the device comprising:
   a compute in memory (CIM) module configured to apply a plurality of analog weights to input data using at least one multiply-accumulate operation to generate an output;
   a digital weight storage unit configured to store a plurality of digital weight references, wherein a digital weight reference of the plurality of digital weight references corresponds to an analog weight of the plurality of analog weights; and
   a device controller configured to:
      program the plurality of analog weights to the CIM module based on the plurality of digital weight references;
      determine that one or more analog weights of the plurality of analog weights is degraded by determining that a distance between the one or more analog weights and one or more corresponding baseline weight values exceeds a threshold distance; and
      reprogram, based on a determination that the one or more analog weights are degraded, the one or more analog weights based on corresponding digital weight references from the digital weight storage unit without reference to the host device,
      wherein:
         the plurality of digital weight references in the digital weight storage unit is populated with values from a host device,
         the CIM module comprises an error correction component configured to monitor and correct errors in the plurality of analog weights programmed to the CIM module, and
         the plurality of analog weights is reprogrammed based on corresponding digital weight references stored in the digital weight storage unit when a threshold amount of time has passed since the analog weights were written to the CIM module.

2. The device of claim 1, wherein:
   the CIM module comprises a first array of bit cells and a second array of bit cells, each configured to be individually programmed with the plurality of analog weights; and
   the device controller is further configured to program the plurality of analog weights to one of the first or second array of bit cells while causing the other of the first or second array of bit cells to generate the output.

3. The device of claim 1, wherein in order to determine that one or more analog weights of the plurality of analog weights is degraded, the device controller is further configured to determine that a threshold amount of time has passed since the analog weights were programmed to the CIM module.

4. The device of claim 3, wherein the threshold amount of time is determined based on one or more parameters of the CIM module.

5. The device of claim 1, wherein in order to determine that one or more analog weights of the plurality of analog weights is degraded, the device controller is further configured to determine that the output falls below an output threshold.

6. The device of claim 1, wherein the device controller is further configured to determine that one or more analog weights of the plurality of analog weights is degraded based on a wear leveling mechanism applied to the CIM.

7. The device of claim 6, wherein the device controller is further configured to apply the wear leveling mechanism to the CIM, the wear leveling mechanism configured to:
   read values corresponding to a selection of bit lines or word lines in the CIM module, and
   determine that the plurality of analog weights are degraded based on the read values of the selection of bit lines or word lines in the CIM.

8. The device of claim 1, wherein in order to determine that one or more analog weights of the plurality of analog weights is degraded, the device controller is further configured to:
   read values corresponding to the programmed plurality of analog weights from the CIM;
   convert the read values to digital values; and
   determine that at least one digital value differs from a corresponding digital weight reference stored in the digital weight storage unit by more than a threshold difference value.

9. The device of claim 8, wherein the threshold difference value comprises a Hamming distance.

10. The device of claim 1, wherein in order to determine that one or more analog weights of the plurality of analog weights is degraded, the device controller is further configured to determine an idle period of the CIM module exceeds an idle period threshold value.

11. A method comprising:
   storing a plurality of digital weight references in a digital weight storage unit, wherein a digital weight reference of the plurality of digital weight references corresponds to an analog weight of a plurality of analog weights applied by a compute in memory (CIM) module;
   programming, via a device controller, the plurality of analog weights to the CIM module based on the plurality of digital weight references;

processing input data, via the CIM module, with the plurality of analog weights according to at least one multiply-accumulate operation to generate an output; and determining, via the device controller, that one or more analog weights of the plurality of analog weights is degraded by determining that a distance between the one or more analog weights and one or more corresponding baseline weight values exceeds a threshold distance;

monitoring and correcting errors in the plurality of analog weights programmed to the CIM module via an error correction component; and reprogramming, based on a determination that the one or more analog weights are degraded, the one or more analog weights based on corresponding digital weight references from the digital weight storage unit without reference to the host device wherein the plurality of digital weight references in the digital weight storage unit is populated with values from a host device.

12. The method of claim 11, wherein:

the CIM module comprises a first array of bit cells and a second array of bit cells, each configured to be individually programmed with the plurality of analog weights; and programming the plurality of analog weights to the CIM module comprises programming the plurality of analog weights to the first array of bit cells while causing the array of bit cells to generate the output.

13. The method of claim 11, wherein determining that one or more analog weights of the plurality of analog weights is degraded comprises determining that a threshold amount of time has passed since the plurality of analog weights were programmed to the CIM module.

14. The method of claim 11, wherein determining that one or more analog weights of the plurality of analog weights is degraded comprises determining that the output falls below an output threshold.

15. The method of claim 11, wherein determining that one or more analog weights of the plurality of analog weights is degraded comprises monitoring values corresponding to a selection of bit lines or word lines in the CIM module via a wear leveling mechanism applied to the CIM.

16. The method of claim 11, wherein determining that one or more analog weights of the plurality of analog weights is degraded comprises:

reading values corresponding to the programmed plurality of analog weights from the CIM;

converting the read values to digital values; and determining that at least one digital value differs from a corresponding digital weight reference stored in the digital weight storage unit by more than a threshold difference value.

17. The method of claim 11, wherein determining that one or more analog weights of the plurality of analog weights is degraded comprises determining that an idle period of the CIM module exceeds an idle period threshold value.

18. A device for performing compute in memory (CIM) computations, the device comprising:

means for processing input data with a plurality of analog weights according to at least one multiply-accumulate operation to generate an output;

means for storing a plurality of digital weight references, wherein a digital weight reference of the plurality of digital weight references corresponds to an analog weight of the plurality of analog weights applied by the means for processing;

means for programming the plurality of analog weights to the means for processing based on the plurality of digital weight references;

means for determining that one or more analog weights of the plurality of analog weights is degraded by determining that a distance between the one or more analog weights and one or more corresponding baseline weight values exceeds a threshold distance;

means for monitoring and correcting errors in the plurality of analog weights programmed to the CIM module via an error correction component; and means for reprogramming, based on a determination that the one or more analog weights are degraded, the one or more analog weights based on corresponding digital weigh references from the digital weight storage unit without reference to the host device.

* * * * *